United States Patent [19]

Sugiyama et al.

[11] Patent Number: 4,969,137

[45] Date of Patent: Nov. 6, 1990

[54] OPTICAL RECORDING AND REPRODUCING APPARATUS HAVING A MULTI-SPOT POSITIONING CONTROL MECHANISM

[75] Inventors: Hisataka Sugiyama, Tokyo; Takeshi Maeda, Kokubunji; Atsushi Saito, Ichikawa; Fumio Hara, Kodaira, all of Japan

[73] Assignee: Hitachi, Ltd., Tokyo, Japan

[21] Appl. No.: 155,697

[22] Filed: Feb. 16, 1988

[30] Foreign Application Priority Data

Mar. 20, 1987 [JP] Japan .................................. 62-63770
Jul. 14, 1987 [JP] Japan ................................. 62-173930

[51] Int. Cl.$^5$ ...................... G11B 17/22; G11B 21/00
[52] U.S. Cl. .................................. 369/32; 250/201.5; 369/44.11; 369/112; 369/41
[58] Field of Search .................. 369/44, 41, 45, 46, 369/106, 112, 122, 32, 33; 250/201 DF

[56] References Cited

U.S. PATENT DOCUMENTS

| | | | |
|---|---|---|---|
| 4,462,095 | 7/1984 | Chen | 369/44 |
| 4,695,992 | 9/1987 | Aoi | 369/44 |
| 4,727,528 | 2/1988 | Wyland | 369/46 |

FOREIGN PATENT DOCUMENTS 3323007 6/1984 Fed. Rep. of Germany .
3545996 7/1986 Fed. Rep. of Germany .

OTHER PUBLICATIONS

Jenkins & White, *Fundamentals of Optics*, The Maple Press Co., York, Pa. 1957, pp. 16 & 17.

*Primary Examiner*—Steven L. Stephan
*Attorney, Agent, or Firm*—Antonelli, Terry Stout & Kraus

[57] ABSTRACT

In optically coupling a plurality of light sources to an optical system for focusing light beams from the light sources into spots on a record plane, a center axis of a light beam from a first one of the light sources is aligned to an optical axis of the focusing optical system, and the spots other than a first spot formed by the light beam from the first light source are rotated around the first spot on the record plane to position the spots to the respective target tracks, and a tracking error signal for at least one of the first spot and another spot is detected and the positions of the plurality of spots are integrally controlled based on the detected tracking error signal so that the plurality of spots can follow the respective target tracks. The target tracks to which the spots are to be positioned may be either one track or different tracks. The positioning of the spots to the target tracks may be done either manually or automatically. In the automatic method, a tracking error signal is detected for the first spot, and a deflection mechanism for radially swinging beams from the laser light sources is controlled to control the positions of the spots on the record plane and to cause the first spot to follow the target track.

24 Claims, 19 Drawing Sheets

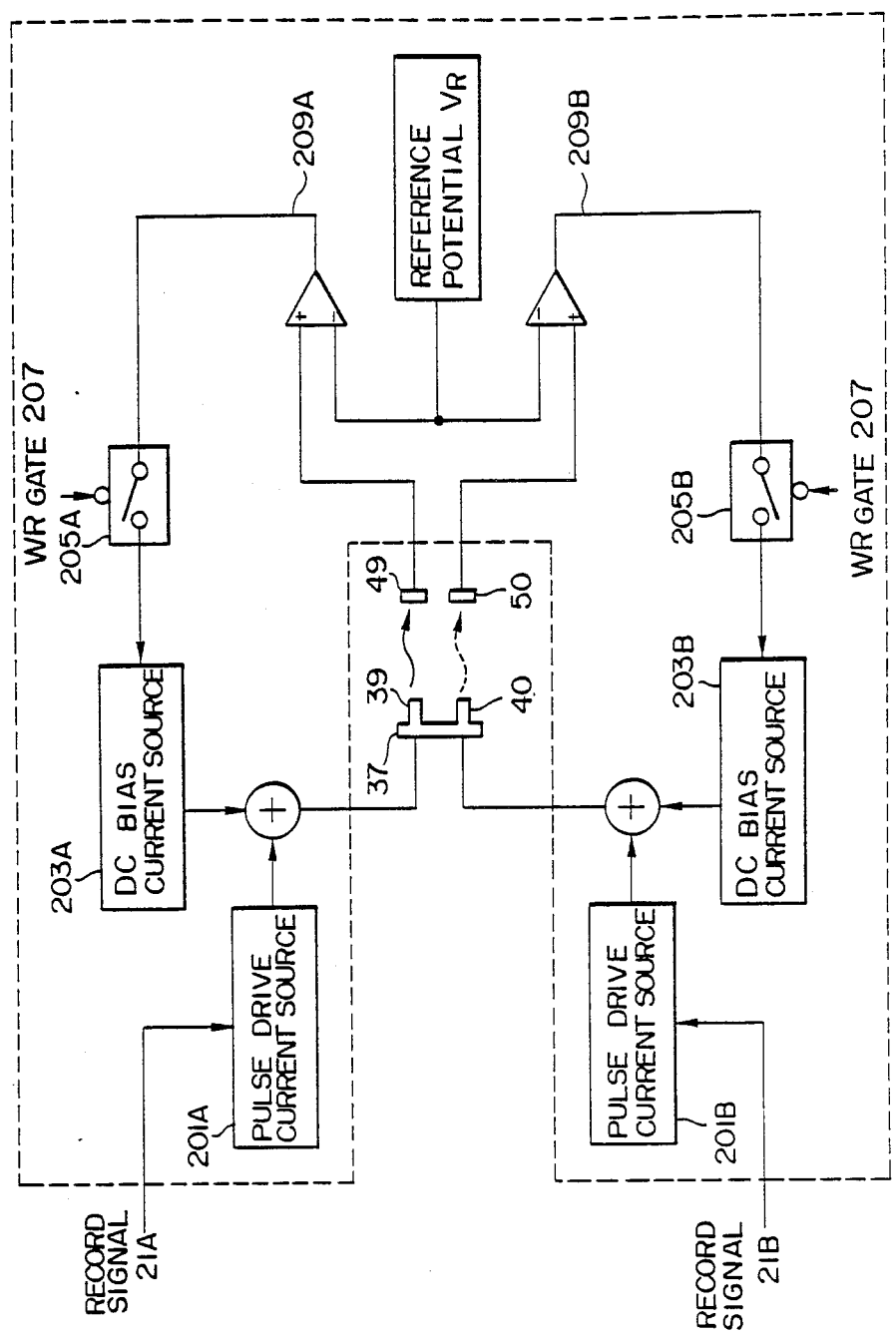

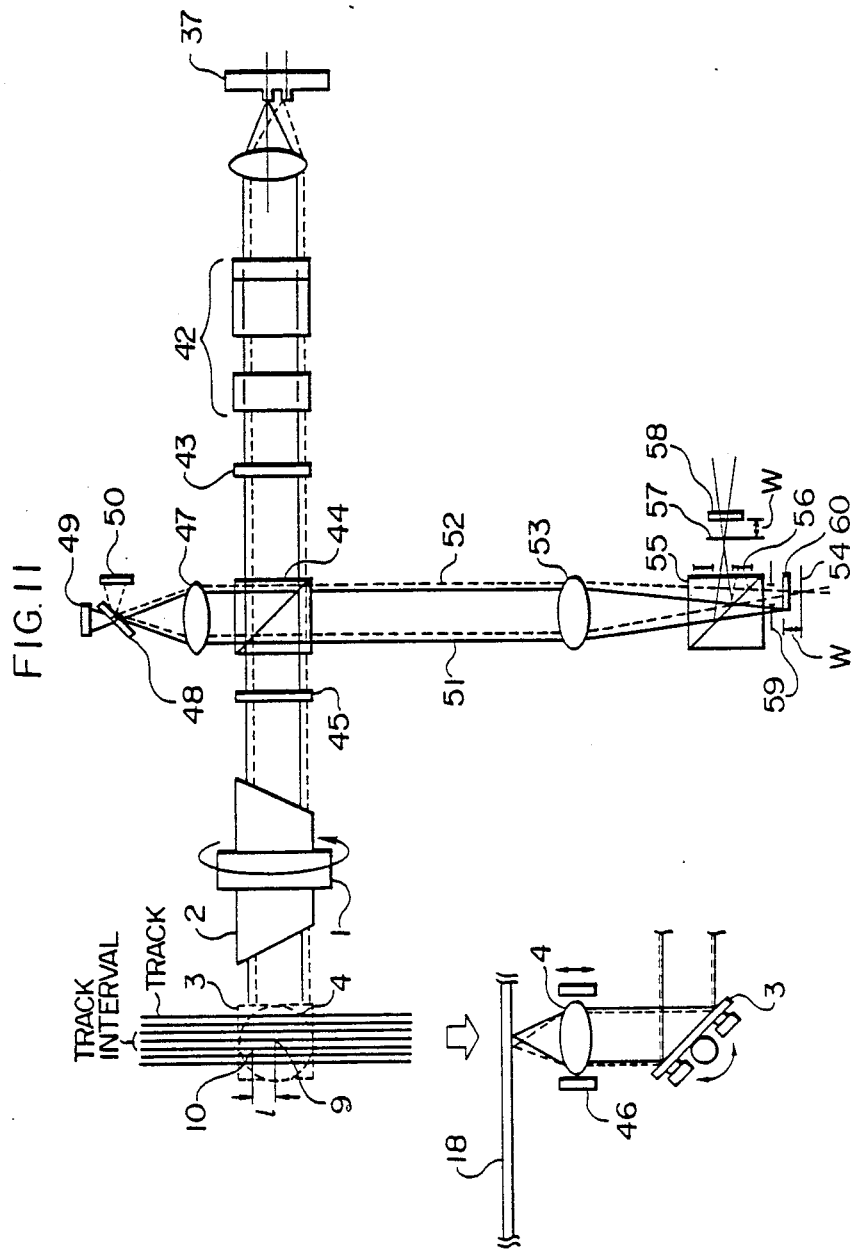

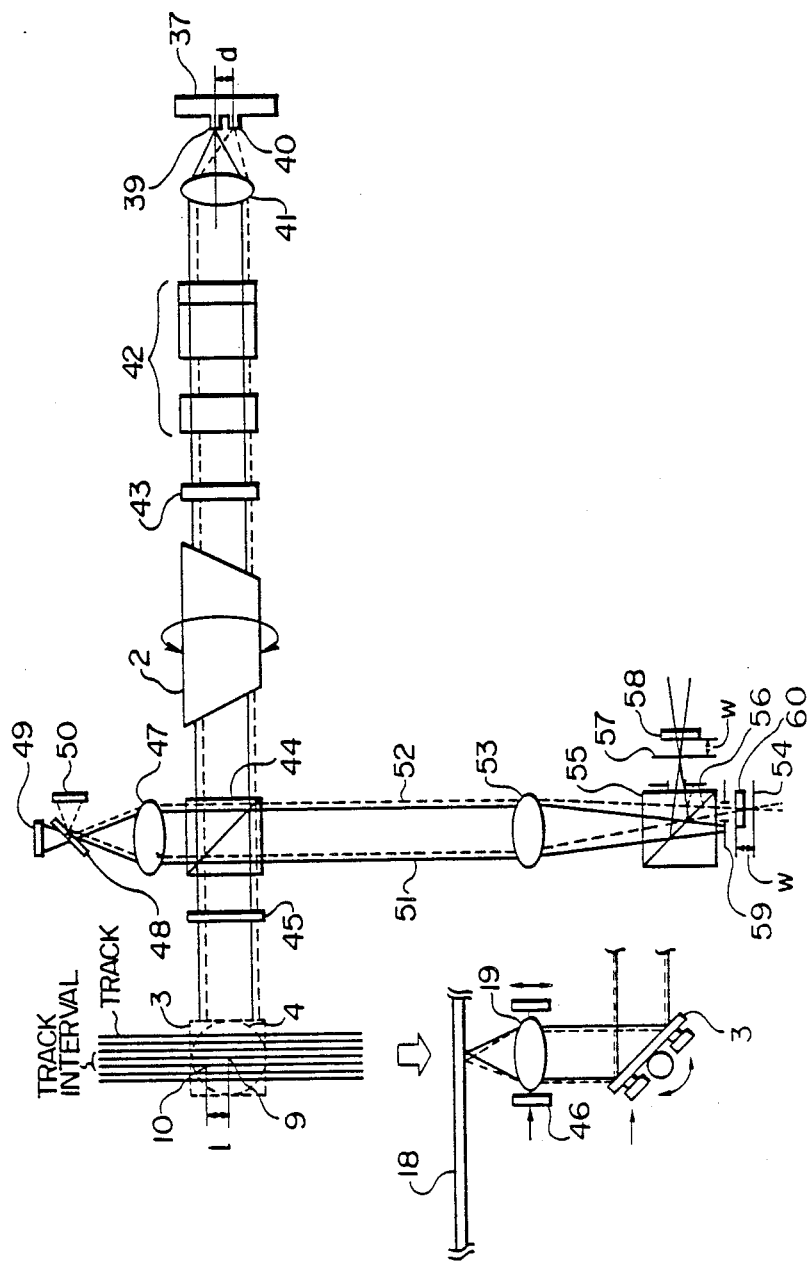

OPTICAL RECORDING AND REPRODUCING APPARATUS HAVING A MULTI-SPOT POSITIONING CONTROL MECHANISM

BACKGROUND OF THE INVENTION

The present invention relates to an optical recording and reproducing apparatus for recording and reproducing information by using a plurality of light spots, and more particularly to a multi-spot positioning controller for causing a plurality of light spots to follow target tracks of a disk.

An optical recording and reproducing apparatus having a plurality of light sources has the following two problems to be resolved.

The first problem is to position to desired tracks two light spots formed by light beams emitted from two light sources and focused onto a disk through a common optical system. A track pitch is usually in the order of 1 $\mu$m, and in order to read information on the target track with a satisfactory S/N ratio, a center of the light spot and a center of the track must be aligned at a precision of at least 0.1 $\mu$m. Accordingly, in the prior art apparatus, where two separate light sources are used, it is necessary to position the light spot of each light source to the target track with the above precision.

When a monolythic array semiconductor laser having an activation layer on a substrate or a hybrid array semiconductor laser having a plurality of semiconductor laser chips on one mount is used, in order to form a plurality of light spots on a disk by light beams emitted from the respective light sources and passed through a common optical system, the array semiconductor laser should be coupled to the optical system such that the plurality of light spots are simultaneously positioned to their respective target tracks.

When information is recorded and reproduced to and from the disk by using a plurality of light spots, it is necessary to vary an angle between a line connecting two of the plurality of spots and a tangential direction of the disk. In JP-A-No. 61-214240, when a laser array having a plurality of light sources in one laser system (mount) is used as a multiple light source, an inclination of an optical head is changed by a lead screw or the laser system is inclined by an electrostrictive element. Where a plurality of independent lasers are used and the beams emitted from those lasers are focused by a common focusing optical system to form a plurality of spots on the disk, the inclination of the optical head is varied, the positions of the lasers are displaced perpendicularly to the optical axis, or an inclination of an optical element of an optical system for directing the beams of the lasers to the common focusing optical system is varied as shown in JP-A-No. 61-5443. When the positions of the plurality of light spots slightly vary by a temperature change, tracking error signals for the respective light spots are detected to change the above angles. In a tracking control system disclosed in JP-A-No. 61-5443 in which first and second light spots follow target tracks through a common focusing optical system, tracking error signals for the first and second light spots are detected to cause the light spots to follow the target tracks. In starting the control system, a first control loop is closed to cause the first light spot to precisely follow the target track to compensate for eccentricity and cause the second light spot to be roughly positioned to the target track. Under this condition, the second control loop is closed to compensate for a slight tracking error of the second light spot. Because of such a control system, a control gain of the second control loop may be much smaller than that of the first control loop, and a control band may also be narrow.

In the prior art apparatus, it has not been considered to examine whether the plurality of light spots were positioned to their respective target tracks and variably set the angle in accordance with the result of examination. As a result, even if the plurality of light spots are set in the optical adjustment stage such that they are positioned to the target tracks, the light spots may be positioned to other tracks than the target tracks by a temperature drift of the optical system, and this cannot be detected or compensated. In an apparatus having two recording and reproducing functions, for example, an apparatus having a function of rendering two light spots to follow one track with one light spot recording information while the other light spot reproducing the information, or a function for positioning two light spots to different tracks and record and reproduce information by the respective light spots, it is difficult to switch the functions. When disks of different nominal track pitches are used, the light tracks may be positioned to other track than the target track.

The second problem is to separate reflected light beams from the disk through the common optical system for the two light spots closely located on the disk and read information of the respective tracks. The separation method is classified into two major methods. One is a wavelength separation method which uses light sources of different wavelengths, and the other is a space separation method which spatially separates two slightly deviated reflected light beams.

One example of the wavelength separation method is disclosed in JP-A-No. 61-20235, in which two separate light sources having different wavelengths are used and the reflected light beams are separated by a dielectric mirror.

In this wavelength separation method, chromatic aberration due to wavelength scattering occurs by an element of the optical system which focuses the beams emitted from the two light sources onto the disk through a common optical axis. Accordingly, an optical element to cancel the chromatic aberration is added or an expensive dielectric mirror wavelength separation filter having a high separation resolution is used to reduce a wavelength difference of the light sources such that the influence of chromatic aberration can be neglected. With an element having two activation layers on one substrate such as a monolythic array semiconductor laser, it is difficult to produce light beams of different wavelengths.

An example of the space separation method is disclosed in '85 Optical Memory Symposium, pages 107–112, 1985, in which a reflected light beam from the disk is enlarged and focused, a reflection plate having a pinhole is located at a focus plane position with an angle to the focus plane, the reflected light beam for one light spot passes through the pinhole and the reflected light beam for the other light spot is reflected. Another example of the space separation method is disclosed in Applied Physics, 1986 Fall, 30p-ZE-2, in which the fact that beams emitted by a two-array laser have a slight angle difference on a common optical axis and the two reflected light beams having the slight angle difference are separated by a critical angle prism which is arranged such that an incident angle for one reflected light beam is larger than the critical angle and an incident angle for the other reflected light beam is smaller than the critical angle. When the space separation method is used, the problems encountered in the wavelength separation method do not arise, but an optical system for controlling automatic focusing and tracking for one of the separated light beams should be provided. Accordingly, a compact optical system cannot be provided.

SUMMARY OF THE INVENTION

It is a first object of the present invention to provide multi-spot positioning apparatus and method which permit precise positioning of light spots to target tracks without requiring complex adjustment when light sources are coupled to an optical system.

It is a second object of the present invention to provide a multi-spot positioning control method and apparatus which permit precise positioning of a plurality of light spots to target tracks without error even when there is a deviation due to a temperature drift of an optical system, information recorded and reproduced with disks of different recording and reproducing methods, or information recorded and reproduced with disks of different track pitches.

It is a third object of the present invention to provide a compact optical recording and reproducing apparatus which can integrate an optical system for separating reflected light beams from a record surface to read information of respective tracks and an optical system for controlling automatic focusing and tracking.

In order to achieve the above objects, in accordance with the present invention, a plurality of light sources are optically coupled to an optical system which focuses light beams from the plurality of light sources onto the record surface as spots. A center axis of the light beam from the first light source coincides with an optical axis of the focusing optical system, and the spots other than the first spot formed by the light beam from the first light source are rotated on the record surface around the first spot so that the spots are positioned to the target tracks. A tracking error signal for at least one of the first spot and another spot is detected and the positions of the spots are integrally controlled based on the tracking error signal so that the spots follow the respective tracks. The tracks on which the spots are to be positioned may be either one track or different tracks.

An array semiconductor laser having first and second light sources of the same wavelength or different wavelengths arranged so that the polarization directions are coincident is used as the light sources. A center axis of the beam of the first light source of the array semiconductor laser coincides with the optical axis of the focusing optical system.

A deflection mechanism for rotating spots around the first spot on the record surface or disk has a function to move relative positions of all spots, including the second spot, other than the first spot relative to the first spot on the record surface. An image rotation prism having a center axis thereof arranged to coincide with the optical axis of the focusing optical system is used as the deflection mechanism. The focusing optical system may comprise a collimator lens for collimating the output beam of the semiconductor laser, an image rotation prism having a center axis thereof arranged to coincide with the optical axis of the optical system, a polarization beam splitter (polarization prism) whose ratio of a transmissivity to a reflection factor is inverted depending on a polarization direction of a light beam applied thereto, a λ/4 wavelength plate and a focusing lens for focusing the light beam onto the disk. First, only the first light source is activated. The reflected light beam from the disk surface passes through the focusing lens and is rotated by 90° with respect to the incident light by the λ/4 plate, and reflected by the polarization beam splitter to a different direction than that of the incident light beam. The reflected light beam is directed to a signal detection optical system which comprises an automatic focusing error detection system, a tracking error detection system and an information signal detection system. In this manner, the optical system is adjusted for only the first light source. At this time, the array semiconductor laser is perfectly fixed to the focusing optical system, and the light spot for the first light source follows the target track on the disk. Then, the second light source is also activated and the image rotation prism is adjusted such that the light spot for the second light source is positioned to the target track. Since the center axis of the beam emitted from the first light source coincides with the optical axis of the optical system, the first light spot does not deviate from the target track as the image rotation prism is rotated. In this manner, the light spots for the plurality of light sources are positioned to the respective target tracks.

The positioning of the light spots to the target tracks may be done either manually or automatically. In the automatic positioning, the tracking error signal for the first spot is first detected, and the positions of all spots on the record surface are integrally controlled by the deflection mechanism which integrally and radially deflects all beams from all laser light sources so that the first spot follows its target track. A track address for the first spot is detected. Based on the detected track address, a track address to which a second spot is to be positioned and which corresponds responds to a beam from one of the light sources having a center axis whose output beam does not coincide with the optical axis of the optical system, is selected, and the second spot is rotated around the first spot on the record surface so that the second spot is positioned to the track having the selected track address. Then, a tracking error signal for the second spot is detected and the deflection mechanism for rotating all spots other than the first spot around the first spot on the record surface is controlled so that the second spot follows the target track. In this manner, all spots can be automatically positioned to the target tracks.

The method for selecting the track address to which the second spot is to be positioned based on the track address for the first spot and positioning the second spot to the selected address and the target track detection function for performing the above method can position a plurality of spots to the target tracks even when information is recorded and reproduced with disks having different recording and reproducing methods or with disks having different track pitches.

The method for detecting the tracking error signals for the first and second spots to control the deflection mechanism so that the spots follow the respective tracks and the first and second tracking servo mechanisms for performing the above method can cause the first and second spots to precisely follow the respective tracks.

In the specification, the term follow means to precisely position the spot to the track by the servo mechanism, and the term positioning means positioning of the spot into a range of precision under which the servo mechanism can pull the spot into the target track.

The signal detection optical system for separating the reflected light beams from the record surface, detecting information from the respective tracks and detecting automatic focusing error and tracking error is now explained. The signal detection optical system has a lens which expands and focuses the reflected collimated light beam. A light flux separation element is provided between the lens and a focus plane thereof. The separation element may be a half-prism which transmits 50% of the light beam and reflects 50% of the light beam to separate them in two directions. First and second slits are provided between the half-prism and first and second focus planes of the first and second separated light beams, respectively. The first slit blocks a reflected light beam for the second light source and transmits a reflected light beam for the first light source. A first photo-detector for detecting the reflected light beam for the first light source is provided. The second slit blocks a reflected light beam for the first light source and transmits a reflected light beam for the second light source. A second photo-detector for detecting the reflected light beam for the second light source is provided.

The first and second photo-detectors each have at least four photo-sensing planes separated vertically and horizontally. The first photo-detector is arranged between the first slit and the first focal plane, and the second photo-detector is arranged at a position spaced from the second focal plane in a direction of travel of the light beam by the same distance as that between the first photo-detector and the first focal plane so that in an in-focus state a diameter of the light beam at the position of the first photo-detector is equal to a diameter of the light beam at the position of the second photo-detector. Automatic focusing control is effected by a differential detection system by using two upper and lower photo-sensing planes of each of the photo-detectors. A tracking error is detected by a push-pull system by using two left and right photo-sensing planes of each of the photo-detectors. Information is read by using a portion or all of the four photo-sensing planes of each of the photo-detectors. In this manner, the separation detection optical system for the reflected light beams is shared with the control optical system so that a simple and compact optical recording and reproducing apparatus is provided.

In such a signal detection optical system, for the automatic focusing error detection, the first separated light beam for the first light source and the second separated light beam for the second light source can be stably controlled for automatic focusing by the differential detection system by controlling the first and second light sources to output the same light power in the reproduction mode. For the tracking error detection, since the relative positional relation of the two light spots on the disk for the first and second light sources is fixed by the focusing optical system, the tracking control by the push-pull system may be effected for only one of the first and second separated light beams. In this manner, a compact optical recording and reproducing apparatus is provided without adding the optical elements for detecting the automatic focusing error and the tracking error.

BRIEF DESCRIPTION OF THE DRAWINGS

FIG. 13A shows an embodiment without a prism rotation mechanism of the optical system of FIG. 3A.

DESCRIPTION OF THE PREFERRED EMBODIMENTS

Figure 1:
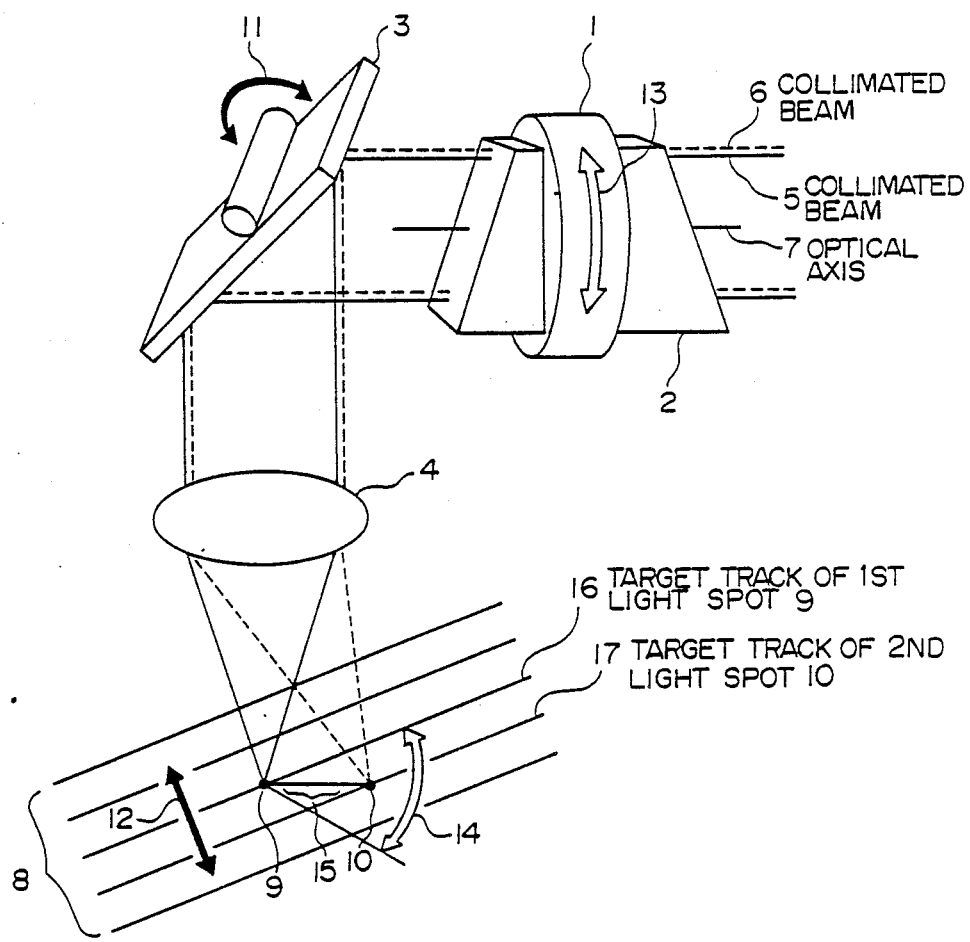
FIG. 1 shows a first embodiment of the present invention

FIG. 1 shows a first embodiment. Two spots are used as multiple spots. An optical system shown in FIG. 1 is an image rotation prism having a rotation mechanism 1 for rotation around an optical axis. In the present embodiment, it comprises a Dare prism 2, a Galvano mirror 3 having a mechanism to change a direction of reflection of a light beam and a focusing lens 4. Of two collimated light beams 5 and 6, the light beam 5 has a center axis thereof aligned with an optical axis 7. The light beam 6 is applied to the Dare prism 2 with a center axis thereof being slightly misaligned from the optical axis 7 like a light beam emitted from a light source arranged with a light source for the light beam 5 at a position slightly displaced along a line perpendicular to the optical axis. As a result, the light beam 5 having the center axis thereof aligned with the optical axis is always emitted parallelly to the optical axis 7 even if the Dare prism is rotated. On the other hand, the light beam 6 having the center axis thereof misaligned with the optical axis is emitted at a double angle of the rotation angle of the Dare prism 2 as the Dare prism is rotated, while the angle to the optical axis 7 being kept constant.

The directions of reflection of the light beams 5 and 6 are changed by the Galvano mirror 3 by the same angle. The two light beams 5 and 6 reflected by the Galvano mirror 3 are focused by the focusing lens 4 onto the disk plane 8 to form first and second light spots 9 and 10, respectively. As the Galvano mirror is rotated as shown by 11, the light spots 9 and 10 are moved together by the same distance radially 12 of the disk, and as the Dare prism 2 is rotated as shown by 13, the light spot 9 does not change its position while the light spot 10 rotates around the light spot 9 by the double angle of the rotation of the prism, as shown by 14. The position of the light spot 9 and a distance 15 between the light spot 9 and the light spot 10 are always constant. The Galvano mirror 3 and the Dare prism 2 are the deflection mechanism for integrally and radially swinging the spots on the disk, and the deflection mechanism for rotating all spots other than the first spot around the first spot on the disk, respectively.

In order to position the light spots 9 and 10 to the target tracks, the rotation of the Galvano mirror is controlled such that the light spot 9 follows the target track 16, and then the rotation of the Dare prism 2 is controlled such that the light spot 10 follows the target track 17.

Figure 2:
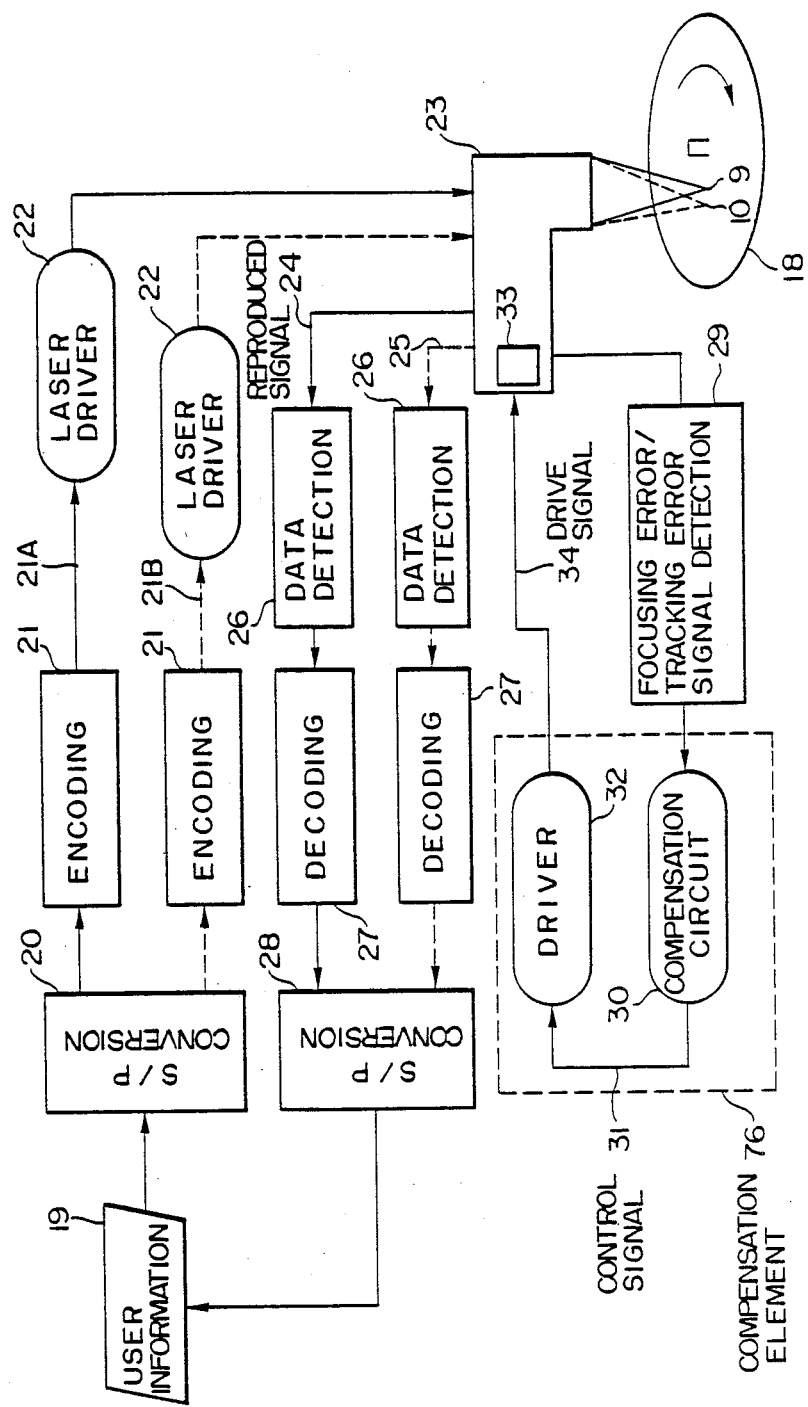
FIG. 2 shows a block diagram of a parallel recording and reproducing apparatus in accordance with the first embodiment.

Referring to FIG. 2, the recording and reproducing system and the control system of the first embodiment are explained.

When user information 19 such as file data or an image signal is to be recorded on a disk 18, the user information 19 is separated into two signals by a serial/parallel converter 20, and those signals are encoded 21 into record signals 21A and 21B. Record pulse currents corresponding to the encoded data are supplied through laser drive circuits 22 to two lasers in a parallel recording and reproducing optical head 23, which apply two light spots 9 and 10 to the disk 18 to parallelly record information.

In reproducing the data, changes in the reflected light intensities detected from the light spots 9 and 10 are detected as reproduced signals 24 and 25 and they are converted to data (data detection 26). The detected data are decoded 27, parallel-second converted 28 and reproduced as user information 19.

The control system is now explained. The items to be servo-controlled are the automatic focusing system and the tracking system for the first light spot 9 and the second light spot 10. As shown in FIG. 2, an error signal is detected 29 based on the change in the reflected light intensity detected by the light spot 9 or 10, and it is supplied to a compensation circuit 30 in the servo loop to produce a control signal 31, which is applied to a drive circuit 32 which in turn produces a drive signal 34 to drive an object 33 to be controlled in the optical head 23. The control system constitutes the above servo system.

The optical head 23 used in the first embodiment is explained with reference to FIGS. 3A, 3B and 3C.

Figure 3A:
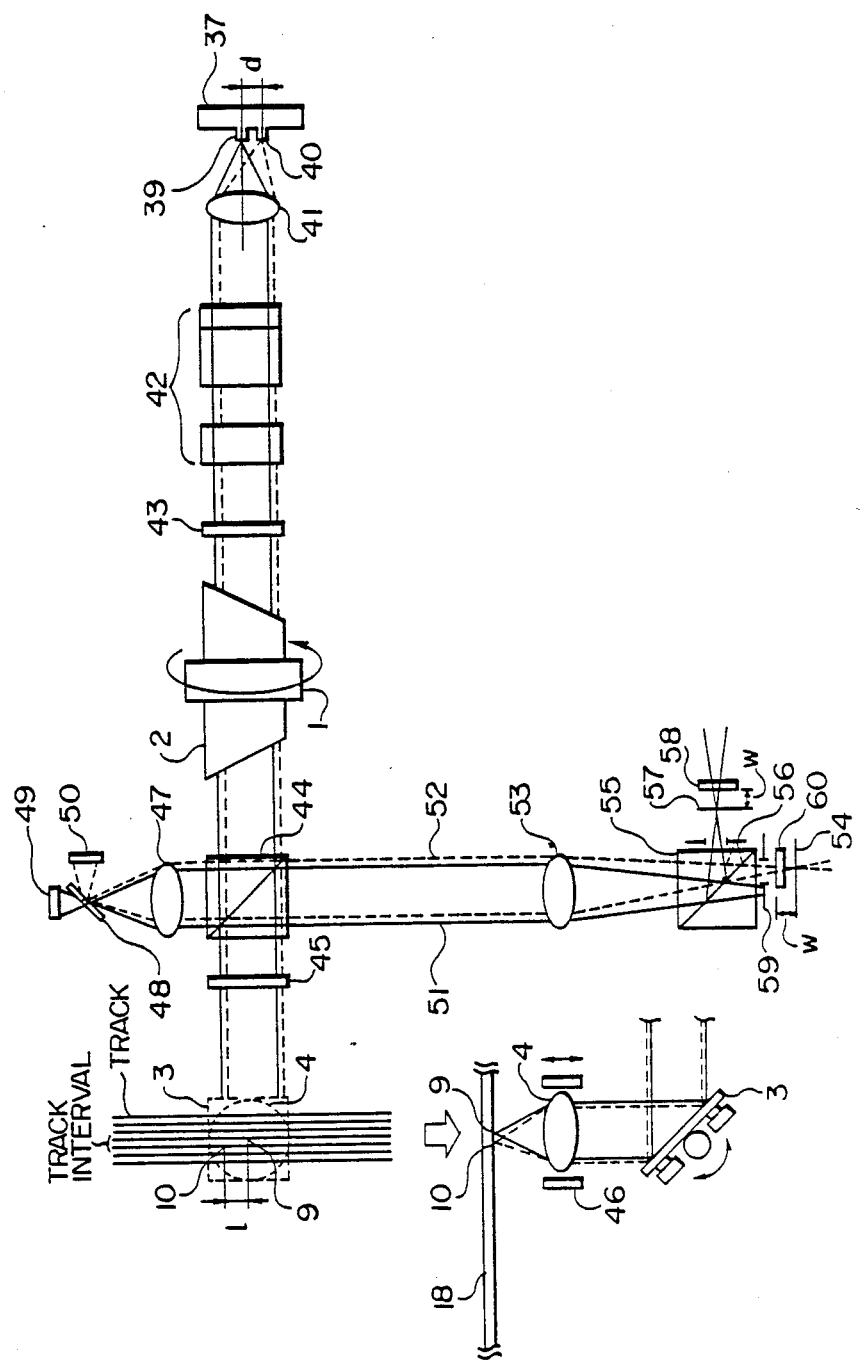
FIG. 3A shows an optical system used in the first embodiment.
Figure 3:
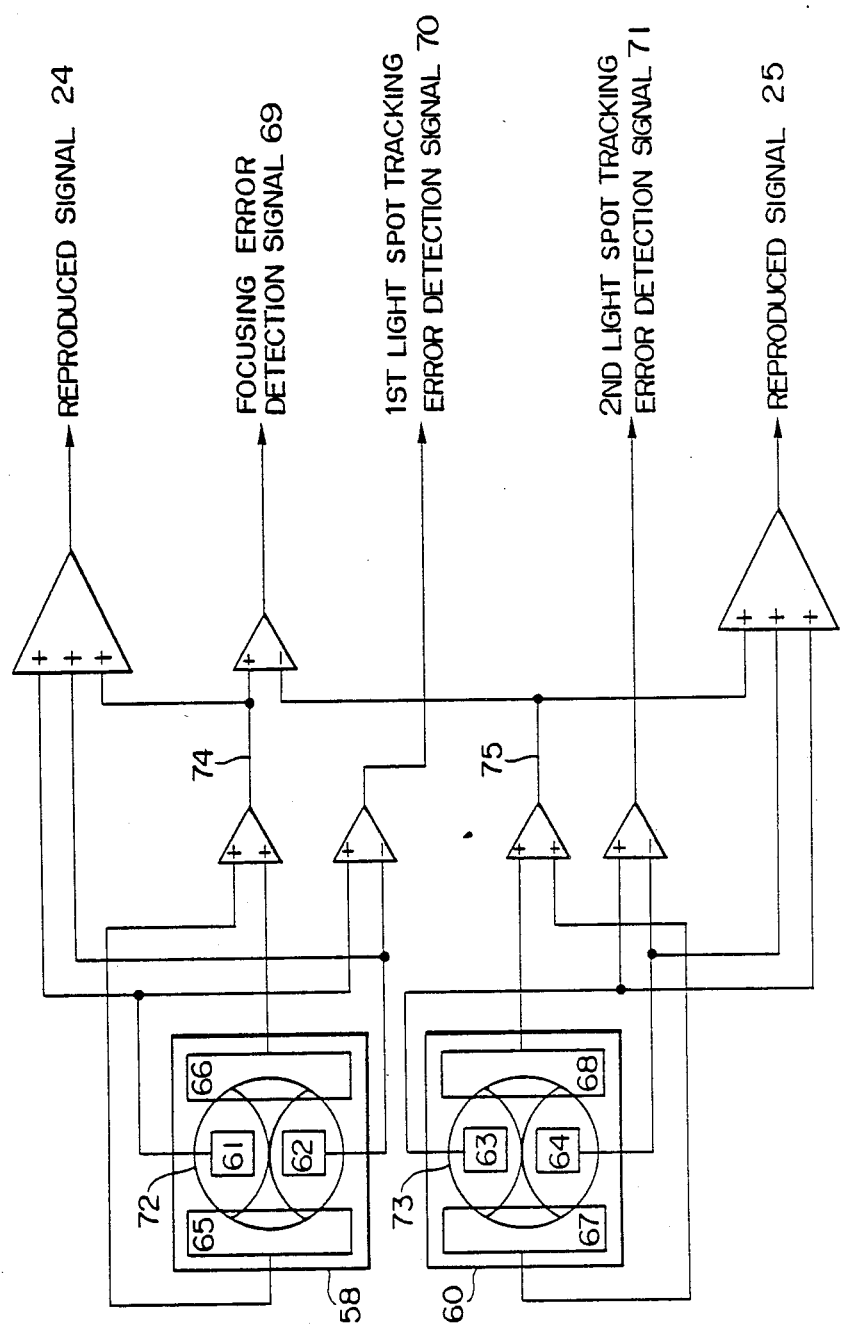
FIG. 3B shows a diagram for detecting focusing error, tracking error and reproduced signal.
FIG. 3C shows a laser drive circuit.

As shown in FIG. 3A, a hybrid array semiconductor laser (laser array) 37 having two laser chips 35 of the same wavelength arranged on a mount with a spacing d therebetween is used for the two light sources. The center axis of the beam emitted from the first light source 39 aligns with the optical axis of the focusing optical system. The focusing optical system comprises a coupling lens 41 for collimating the beams emitted from the first light source 39 and the second light source 40 of the laser array 37, a beam reshaping prism system (which has a 100% transmissivity to a light applied to an incident plane with a horizontal vibration (P polarization)) for converting the oval output beam to a circular beam, a $\lambda/2$ plate 43 for rotating a polarization direction by 90° (where $\lambda$ is a wavelength of the light source), and image rotation prism having the Dare prism 2 which has a 100% transmissivity to the P polarization and can be finely rotated around the optical axis as shown to rotate the image, a polarization beam splitter (polarization prism) 44 which has 70% transmissivity and 30% reflection to the P polarization incident light and 100% reflection to an incident light having vibration perpendicular to the incident plane or S polarization incident light, a $\lambda/4$ plate 45 for converting a linear polarization light to a circular polarization light or vice versa, a Galvano mirror 3 having a drive system for causing the light spots 9 and 10 corresponding to the light sources 39 and 40 focused onto the disk 18 to follow the tracks, a focusing lens 4 for focusing the light beam onto the disk 18, and an actuator 46 for causing the focusing lens 4 to follow the vertical swing of the disk. A lens 47, a mirror 48 having one pinhole and photo-detectors 49 and 50 monitor the light powers of the two light sources by transmitting one of the light beams through the pinhole and reflecting the other by the mirror.

The signal detection optical system for separating the reflected light beam from the disk 18 into two reflected light beams for the first light source 39 and the second light source 40 to detect information of the respective tracks and detecting the automatic focusing error and the tracking error is explained.

A separation lens 53 for enlarging and focusing reflected light beams 51 and 52 from the disk 18 is provided, and a half-prism 55 having 50% transmissivity and 50% reflection to the S polarization incident light beam is provided between the separation lens 53 and a focal plane 54 thereof. A slit for blocking the reflected light beam 52 of the reflected light beam from the half-prism 55 and transmitting the reflected light beam 51 is provided between the half-prism 55 and the focal plane 57. A photo-detector 58 is provided at a position spaced from the focal plane 57 by a distance w. A slit 59 which blocks the reflected light beam 51 of the light beam transmitted through the half-prism 51 and transmits the reflected light beam 52 is arranged between the half-prism and the focal plane 54, and a photo-detector 60 is arranged between the slit 59 and the focal plane 54 at a position spaced from the focal plane 54 by the distance w. As shown in FIG. 3B, the photo-detectors 58 and 60 each have two upper and lower photo-sensing planes 61, 62 and 63, 64 for detecting the tracking error signals, and two left and right photo-sensing planes 65, 66 and 67, 68 for detecting the automatic focusing error signals.

Means for producing the focusing error detection signal 69 of the servo system based on the changes in the light intensities of the photo-detectors, the tracking error detection signals 70 and 71 for the first and second light spots, and the reproduced signals 24 and 25 is explained.

In the present embodiment, the differential system is principally used to detect the automatic focusing error. Unlike the optical system having are light source, the automatic focusing error detection signal 69 is produced as a difference between sizes of the beam spots 72 and 73 of the focal planes 54 and 57 for the reflected light beams 51 and 52 of different light sources, that is, a difference between a sum signal 74 of the signals in the photo-sensing planes 65 and 66 and a sum signal 75 of the signals in the photo-sensing planes 67 and 68. The two spots can be stably and automatically focused onto the disk by controlling the light sources 39 and 40 such that the light outputs thereof are always equal in the reproduction mode.

The tracking error detection method which uses the push-pull system is explained.

Changes in intensity distributions of defraction patterns when the first and second light spots 9 and 10 move across the guide grooves on the disk 18 are detected by a differential signal of detections in the photo-sensing planes 61 and 62 and a differential signal of detections in the photo-sensing planes 63 and 64 to produce a tracking error detection signal 70 for the first light spot and a tracking error detection signal 71 for the second light spot, respectively.

Reproduced signals 24 and 25 for the first and second light spot 9 and 10 are produced as changes in total light intensities detected by the photo-detectors 58 and 60, respectively. Photo-detectors are also provided on the blocking planes of the slits 56 and 59 to detect the reflected beams 52 and 51, and the outputs thereof are added to the sum signals 25 and 24 so that the signals are detected without being affected by the noises.

In the present embodiment, the guide groove pitch is 1.6 $\mu$m, the light spot diameter is 1.6 $\mu$m and the push-pull system is used. In this system, the tracking error signal is given by the change in the defraction pattern and the period of change is equal to the guide groove pitch (track pitch). Accordingly, if there is a tracking error larger than the period, the light spot is pulled into the adjacent track. Accordingly, the precision of arrangement should be less than $\pm 0.8$ $\mu$m in principle, and less than $\pm 0.4$ $\mu$m when the reliability is taken into account. Thus, the mounting angle of the laser array 37 and the rotation angle of the Dare prism 2 are roughly adjusted in the adjustment stage of the optical system such that the first light spot 9 and the second light spot 10 are arranged adjacently with the precision described above. In setting the mounting angle and the rotation angle of the Dare prism 2, the P-polarization incident light is preferable in order to reduce a light loss in the prism facet because the Dare prism 2 has 100% transmissivity to the P polarization. Since the direction of the rotating center axis of the Dare prism 2 aligns with the radial direction of the disk as shown in FIG. 3A, no force acts in the direction of rotation of the prism even if the optical head moves radially of the disk at a high speed. Accordingly, the variation of rotation of the prism is minimal and a stable optical system is provided.

The laser drive circuit 22 is explained with reference to FIG. 3C. In recording information, user data as record data is serial-to-parallel converted, or two record signals 21A and 21B separated by a horizontal synchronization signal for each scan line like a video signal are used. D.C. bias currents are supplied from D.C. bias current sources 203A and 203B to the light sources 39 and 40 of the array laser 37 in order to produce constant power reproducing lights. An automatic power control (APC) is effected to render the reproducing light outputs of the light sources 39 and 40 equal and constant against the temperature change. The light outputs of the light sources are detected by the photo-detectors 49 and 50, and differences between a reference potential $V_R$ are detected. Differential signals 209A and 209B are fed back to the D.C. bias current sources 203A and 203B so that the differential signals become zero. The reference potential is set such that the reproducing light outputs of the desired powers are emitted when the differential signals 209A and 209B are zero. Analog switches 205A and 205B are switched by a WR gate signal 207 so that the differential signals 209A and 209B are not fed back in the record mode. In the present embodiment, in order to monitor the light outputs of the two light sources, two photo-detectors 49 and 50 which spatially separate the light beam are used. Alternatively, the light beam may be detected by one photo-detector without being separated. In this case, the photo-detector is not arranged in the focusing optical system but arranged in the array laser 37 so that the light output emitted from the activation layer on the opposite side to the emission plane is detected. When the apparatus does not record or read information, the two light sources are alternately turned on and off and the respective light outputs are monitored. The turn on/off switching frequency should be sufficiently higher than the frequency band of the automatic focusing control system or the tracking control system.

In recording information, the D.C. current sources 203A and 203B maintain the current outputs of the reproducing mode, the pulse drive current sources 201A and 201B produce recording pulse currents corresponding to the information signals 21A and 21B, and they are supplied to the array laser 37 in addition to the bias currents so that the array laser 37 emits the recording pulse lights to form pit lines corresponding to the information signals 21A and 21B on the two tracks of the disk.

Figure 4:
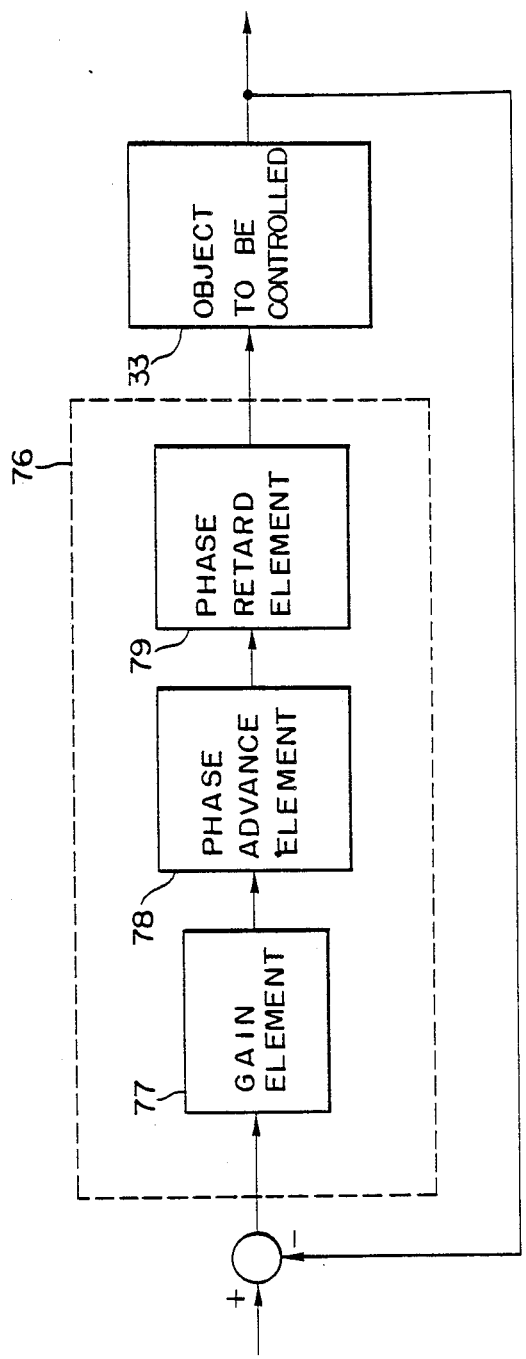
FIG. 4 shows a block diagram of a servo loop system.

The three error detection signals 69, 70 and 71 obtained in the above method are supplied to the compensation circuit 30 and the drive circuit 32 shown in FIG. 2. The circuits 30 and 32 form a servo system compensation element 76 which functions to compensate such that the objects to be controlled such as actuator 46, Galvano mirror 3 and prism rotation mechanism 1 are optimally controlled by the error detection signal. The three servo systems, automatic focusing servo system (AF servo system), tracking servo system by the Galvano mirror (TR1 servo system) and tracking servo system by the prism rotation (TR2 servo system) each form the servo loops shown in FIG. 4. The compensation element 76 usually comprises a gain element 77 including an amplifier and a phase advance element 78 and a phase retard element 79 including resistors and capacitors. Since the tracking servo systems TR1 and TR2 have a strong correlation as will be described later, a design condition for the tracking servo systems is explained below.

In the design, the following three points must be considered.

The first point is that the overall servo system is apt to be astable because the TR1 servo loop and the TR2 servo loop form a double loop. This is because the second light spot is controlled by both the tracking system by the Galvano mirror and the tracking system by the prism rotation. In order to stabilize the entire servo system, the band of the TR2 servo system should be narrower than that of the TR1 servo system and the gain should be sufficiently low.

The second point is that where the track of the disk is eccentric, an A.C. component error of a disk rotation frequency should be corrected by the TR2 servo system in order for the light spot to follow the track. Specifically, in FIG. 1, when the first light spot 9 follows the target track while the TR1 servo system completely compensates for the eccentricity of the disk, the second light spot 10 has an A.C. component error x (μm) which is approximated by $$x = \frac{r}{R} \times l \, (\mu m) \quad (1)$$

where l (μm) is a distance 15 between the first light spot 9 and the second light spot 10, r (μm) is a difference between the center of rotation of the disk and the center of track, that is, an eccentricity, and R (μm) is a radial position on the disk of the light spot. For example, when l=50 μm, R=40 μm and r=80 μm, then x=0.1 μm. This is larger than an allowable tracking error precision 0.05 μm which assures stable readout of the signal. Accordingly, in order to compensate for the A.C. component error of the disk rotation frequency, the TR2 servo band should not be narrower than the disk rotation frequency.

The third point is that when information is recorded and reproduced to and from the disks of slightly different track pitches, or when there is a slight angle error between the radial direction of the disk and the direction of movement of the optical head, the TR2 servo system should have a sufficient low frequency band gain to compensate for a D.C. component tracking error of the second light spot 10.

The compensation elements 76 of the TR1 servo system and the TR2 servo system are designed so that the entire servo system is stable while taking the above three points into consideration. Since there are various cases in the object to be controlled in the TR2 servo system, that is, the prism rotation mechanism 1, the compensation element 76 must be designed in accordance with the transfer function of the mechanism. When a mean value of the tracking error signals 70 and 71 of the first and second light spots is used instead of the tracking error signal of the second light spot 10 as the feedback signal of the TR2 servo system, the instability due to the double loop of the servo systems mentioned in the first point can be completely avoided. In FIG. 3A, if the center axis of the Dare prism 2 slightly deviates from the optical axis of the optical system or the center axis of the beam emitted from the first light source 39 slightly deviates from the optical axis, the second light spot 10 as well as the first light spot 9 are slightly moved as the Dare prism 2 is rotated. In the present servo system design, since the entire servo system of TR1 and TR2 controls with a highest priority to the tracking of the first light spot 9, the two light spots are stably positioned even in the above circumstance.

Figure 5A:
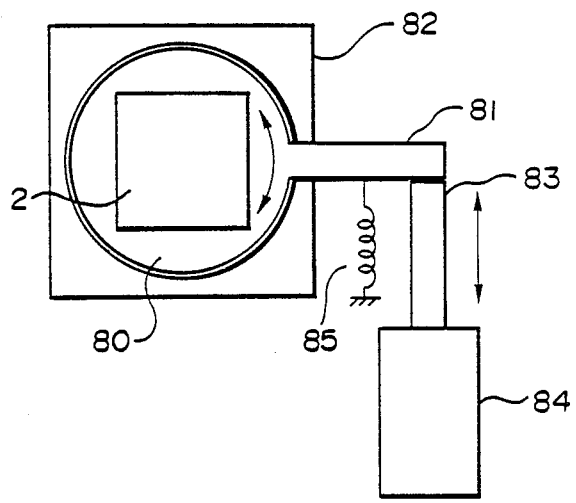
FIGS. 5A and 5B show a prism rotation mechanism.

The drive mechanism 1 for rotating the Dare prism 2 is explained. As shown in FIG. 5A, the drive mechanism has a connecting rod 81 which transmits a motive force to a rotary shaft 80 and which is integrally coupled to the Dare prism 2 with a center axis of rotation being aligned to the center axis of the Dare prism 2. The rotary shaft 80 is supported by a stationary frame 82 for smooth rotation, and a motive force is supplied by a piezoelectric element or an electric linear motor 84 which can linearly drive a motive force rod 83 with a precision of several μm. When the electric linear motor is used, it is supported unilaterally by a support spring 85 in order to avoid backlash. In another embodiment shown in FIG. 5B, the drive mechanism has a geared rotary shaft 86, and worm gear 88 and gear 89 as a reduction mechanism 87, and drives the geared rotary shaft 86 by reducing a rotation power of a servo motor 90. An allowable rotation precision of the servo motor 90 may be large if a plurality of reduction mechanisms 87 are used. A further embodiment of the rotation mechanism is an ultrasonic wave motor having an electrode array and a piezoelectric element array arranged at the junction of the rotary shaft 80 and the stationary frame 82. Since it contains the motive force supply, no motive force transmission mechanism is required and the rotation mechanism is simplified.

A servo start sequence using the servo control system and the rotation mechanism described above is explained with reference to a chart of FIG. 6A and a block diagram of FIG. 6B.

Figure 6A:
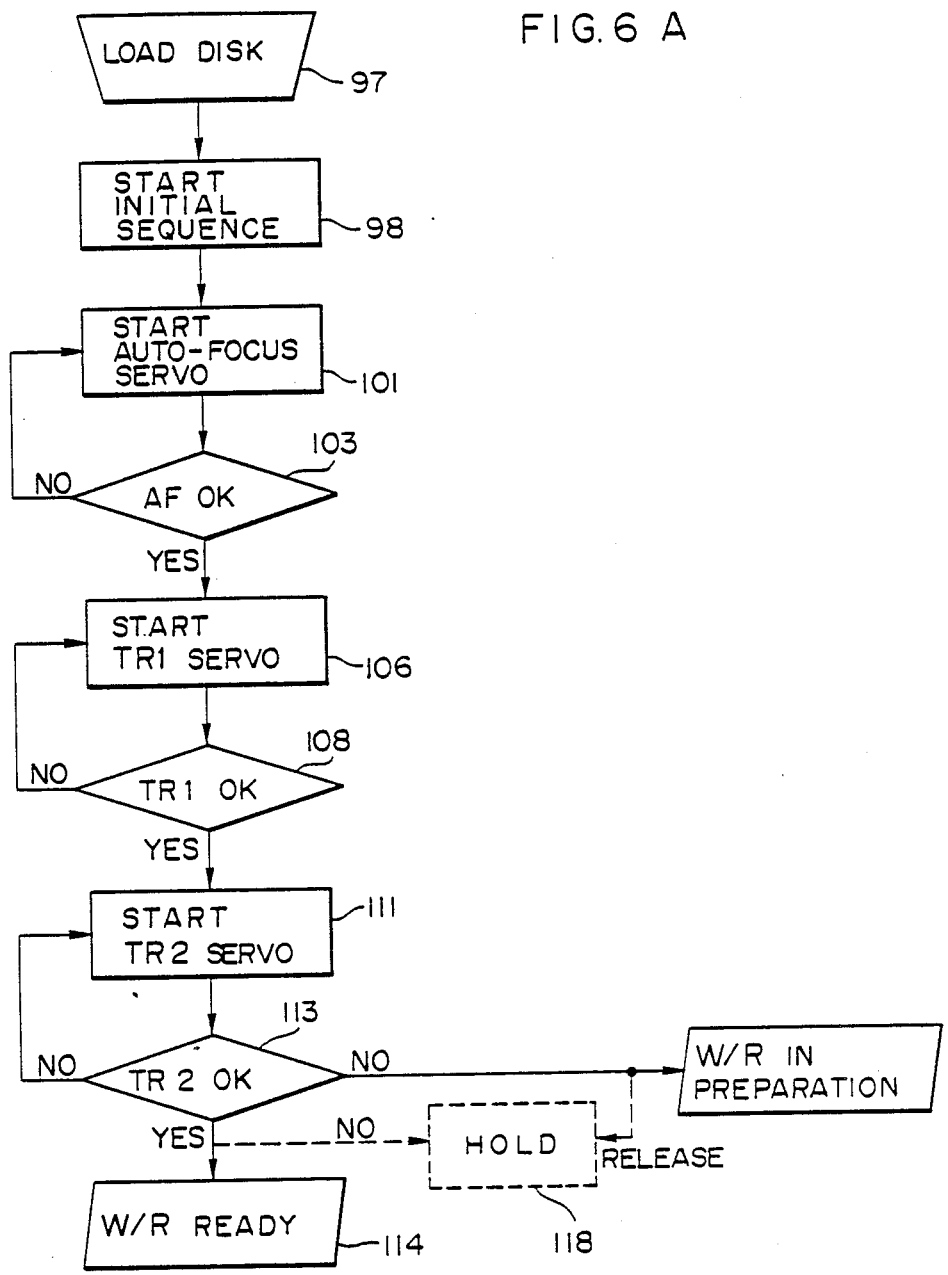
FIG. 6A illustrates a servo start sequence.
Figure 6B:
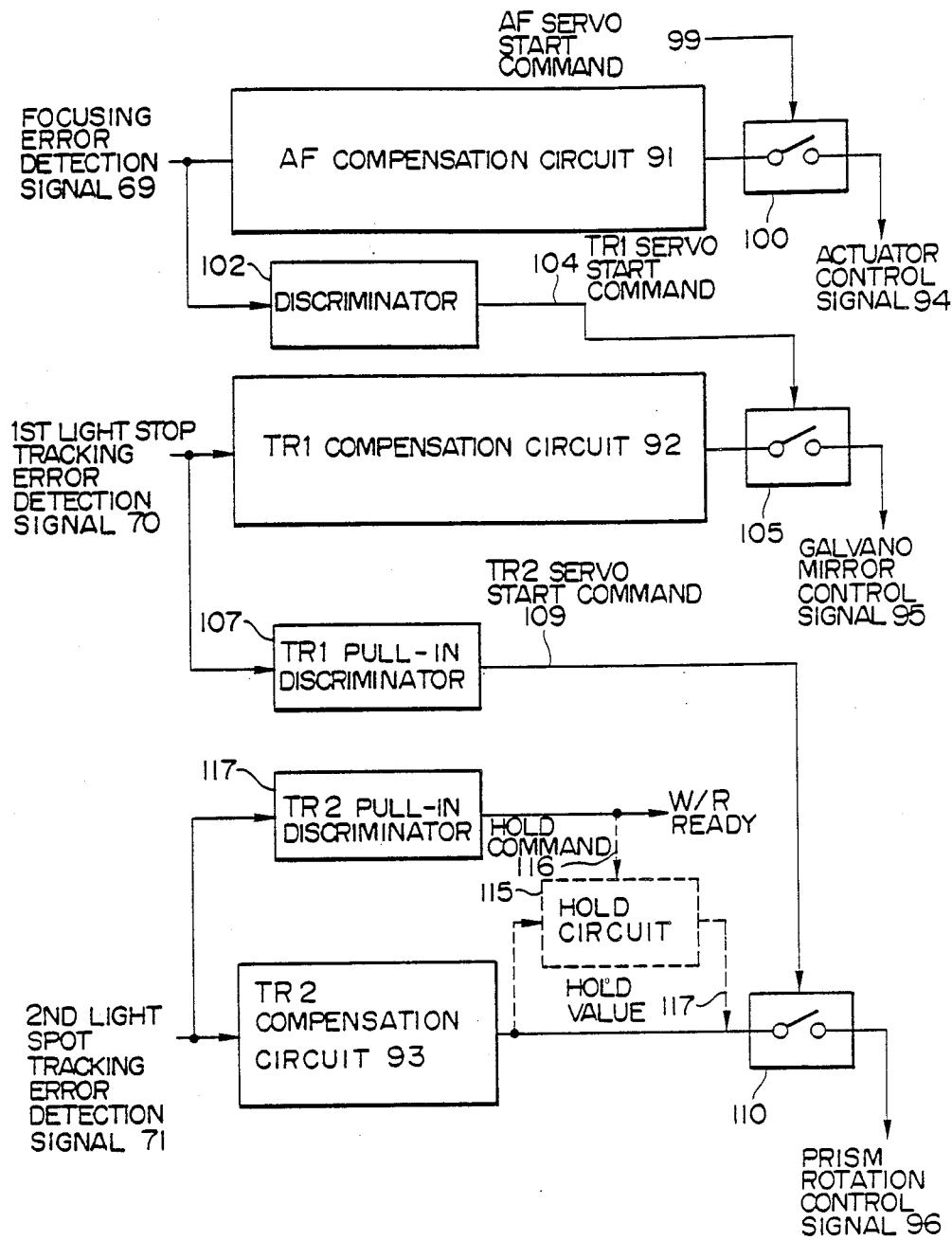
FIG. 6B shows a block diagram of a circuit for executing the sequence.

In FIG. 6B, three error detection signals 69, 70 and 71 pass through the respective compensation circuits 30, namely an AF compensation circuit 91, a TR1 compensation circuit 92 and a TR2 compensation circuit 93 to produce control signals 31, namely an actuator control signal 94, a Galvano mirror control signal 95 and a prism rotation control signal 96.

In FIG. 6A, when the disk is loaded (step 97), the optical head is moved radially of the disk and fixed at a desired position (initial sequence start 98). Then, an analog switch 100 is closed by an AF servo start command 99 to start automatic focusing servo (step 101). The focusing error detection signal 69 is detected to determine whether it is within the allowable variance range, and an AF pull-in detection circuit 102 having a reference voltage and a comparator determines (step 103) whether the automatic focusing servo has completed the pull-in. If the decision is YES, the analog switch 105 is closed by a TR1 servo start command 104, and the TR1 servo is started (step 106). Then, a TR1 pull-in detection circuit 107 determines a step 108, and if the decision is YES, a TR2 servo start command 109 is issued to close an analog switch 110, and the TR2 servo is started (step 111). Then, a TR2 pull-in detection circuit 112 determines a step 113, and if the decision is YES, record and reproduction are made ready (step 114).

In the sequence shown in FIG. 6A, the TR2 servo is started (step 111) by the TR1 servo pull-in decision (step 108). However, since the gain of the TR2 servo is sufficiently lower than that of the TR1 servo, the TR1 servo and the TR2 servo may be simultaneously started, and if both decisions 107 and 113 are YES, the record and reproduction may be made ready (step 114).

In the record and reproduce ready state 114, the TR1 and TR2 servo controls are released by a command from an external controller, the optical head is moved to the designated track, the optical head is fixed, the TR1 and TR2 servo controls are started and the user information is recorded and reproduced.

When the optical head is fixed, not only the Galvano mirror 3 but also the mechanism to move the optical head are controlled by the TR1 control signal (two-stage tracking servo) so that the first light spot can more precisely follow the target track even for a large eccentricity disk and thereafter the TR2 servo control may be stabilized.

When the optical head is moved radially of the disk at a high speed, the analog switches 105 and 110 are usually opened to temporarily release the TR1 and TR2 servo loops. In this case, the Galvano mirror 3 and the prism rotation mechanism 1 may be electrically fixed by continuously supplying drive signals to the Galvano mirror 3 and the prism rotation mechanism 1 so that the TR1 and TR2 control signals 95 and 96 are fixed to the pre-movement states. In this manner, the variation of the drive mechanism when the optical head is moved at the high speed can be suppressed, and high speed servo pull-in can be attained when the TR1 and TR2 servo loops are again closed after the optical head movement.

As shown by broken lines in FIGS. 6A and 6B, a hold circuit 115 for holding a prism rotation control signal 96 may be provided so that the current prism rotation control signal 96 in the record and reproduce ready state 114 is held (step 118) as a hold value 117 by a hold command 116. When the disk is to be exchanged or if the second light spot 10 goes off the track, the holding 118 is released to effect the TR2 servo control and the prism rotation control signal 96 is again held (step 118). When such a holding function is used, a small eccentricity disk should be used because of no compensation ability to the eccentricity of the disk.

On the other hand, there may be a slight angular error between the radial direction of the disk and the direction of movement of the optical head because of a change in an environment. In this case, an angle between a line connecting the first and second light spots 9 and 10 and a tangential line of the disk varies from position to position along the radius of the disk. As a result, even if the optical head is positioned at a point on the disk in the initial sequence start 98 and the prism rotation drive current corresponding to that position is held, the second light spot 10 has a slight tracking error if the optical head is moved to another radial position on the disk. This is serious particularly when the distance between the first light spot 9 and the second light spot 10 is long or the number of a line of spots is large and the distance between the opposite end light spots is long. Thus, in the initial sequence 98, the optical head is positioned at the innermost radial position (radius $r_1$) and the prism rotation drive current (hold value) corresponding to the hold value (HI) at the innermost position is detected. Then, the optical head is positioned at the outermost radial position (radius $r_0$) and the hold value (HO) at the outermost position is detected. A hold value H(r) at a radial position of radius r of the disk is given by the following linear relation.

$$H(r) = HI + (HO - HI)(r - r_1)/(r_0 - r_1) \qquad (2)$$

By varying the hold value 117 with the radial position of the optical head on the disk in accordance with the formula (2), the stable spot positioning control is attained. Although the formula (2) is a continuous function of the radius r, the radius may be divided into sections so that the hold value is kept constant within each section.

The radial position of the optical head on the disk may be detected from the track address detected by the first light spot 9 or by reading a scale attached to the optical head, or from the member of tracks crossed by the optical head when it is moved from the reference radial position (for example, innermost position) of the disk to the desired position.

The above holding function uses the electrical holding circuit. A light spot positioning control apparatus which uses a mechanical holding mechanism is explained with reference to a prism rotation drive mechanism of FIG. 7 and a sequence chart of FIG. 8.

Figure 5B:
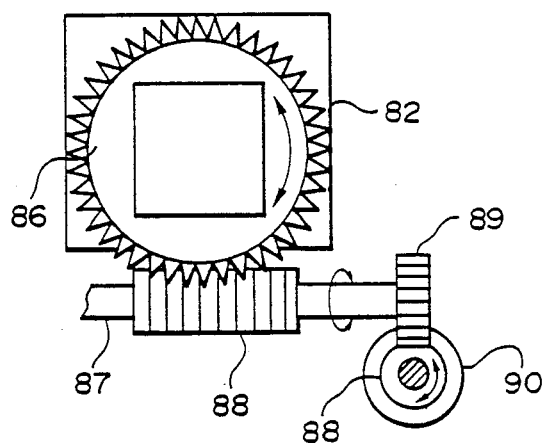

An optical head 23 is moved relative to a base 119 radially 12 of the disk. The optical head 23 incorporates therein a prism rotation gear box 120 comprising a geared rotary shaft 86, a stationary frame 82 and a plurality of reduction gear mechanisms 87, as shown in FIG. 5B. The base 119 incorporates therein a power box 122 comprising a servo motor 90, a gear 89, a worm gear 88 and a permanent magnet 121. When a polarity of a current to an electromagnet 123 fixed to the base 119 is inverted, the power box 122 is moved in a direction 124 so that it is coupled to or decoupled from the prism rotation gear box 120.

Figure 8:
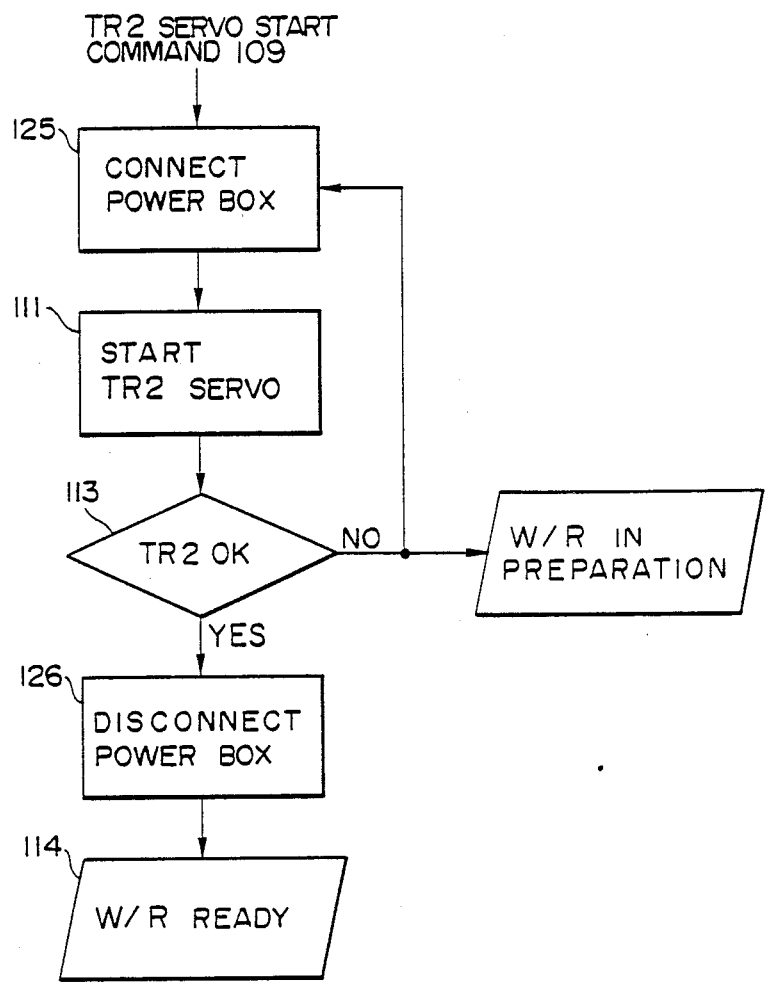
FIG. 8 illustrates a sequence to operate the device of FIG. 7.

The servo sequence of FIG. 8 is explained. The power box 122 is coupled 125 by a TR2 servo start command 109. Then, the TR2 servo is started 111, and the TR2 pull-in detection circuit 112 determines 113. If the decision is YES, the power box 122 is decoupled 126 and the record and reproduce state 114 is started. Since the prism rotation gear box 120 includes the reduction gear mechanism 87, the Dare prism 2 is mechanically fixed after the power box has been decoupled. Since there is no drive source in the optical head, the weight of the optical head 23 can be reduced.

Figure 7:
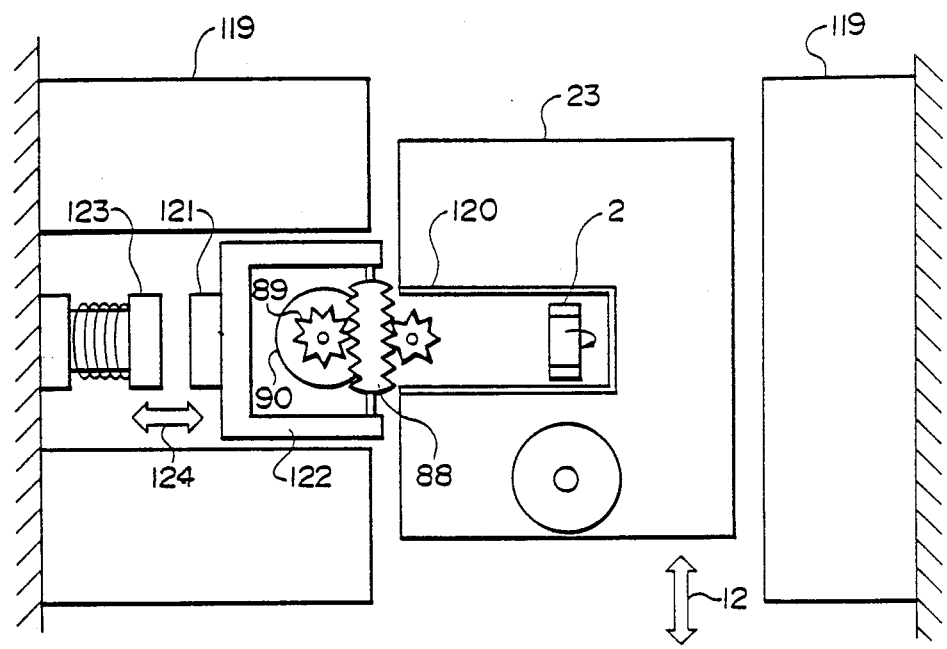
FIG. 7 shows an optical head device having a holding mechanism.

The servo start sequence has been described with reference to FIGS. 6, 7 and 8. By this sequence, the light spots can stably follow the target tracks even if there is a slight difference between the track pitches of the disks or there is a distortion in the optical system due to the temperature drift. In the servo start sequence, it is necessary to coarsely position the first and second light spots 9 and 10 in the optical system adjustment stage such that the first and second light spots are arranged adjacently within a range of $\pm 0.4$ $\mu$m. Further, when a disk of a different type with a track pitch such as 1.2 $\mu$m is used, the second light spot 10 may follow other tracks than the target track. Thus, the following circuit and sequence relating to the target track detection setting function are added to the above servo start sequence so that the above coarse adjustment may be omitted and the parallel recording and reproducing can be attained with the disk of different track pitch.

Figure 9:
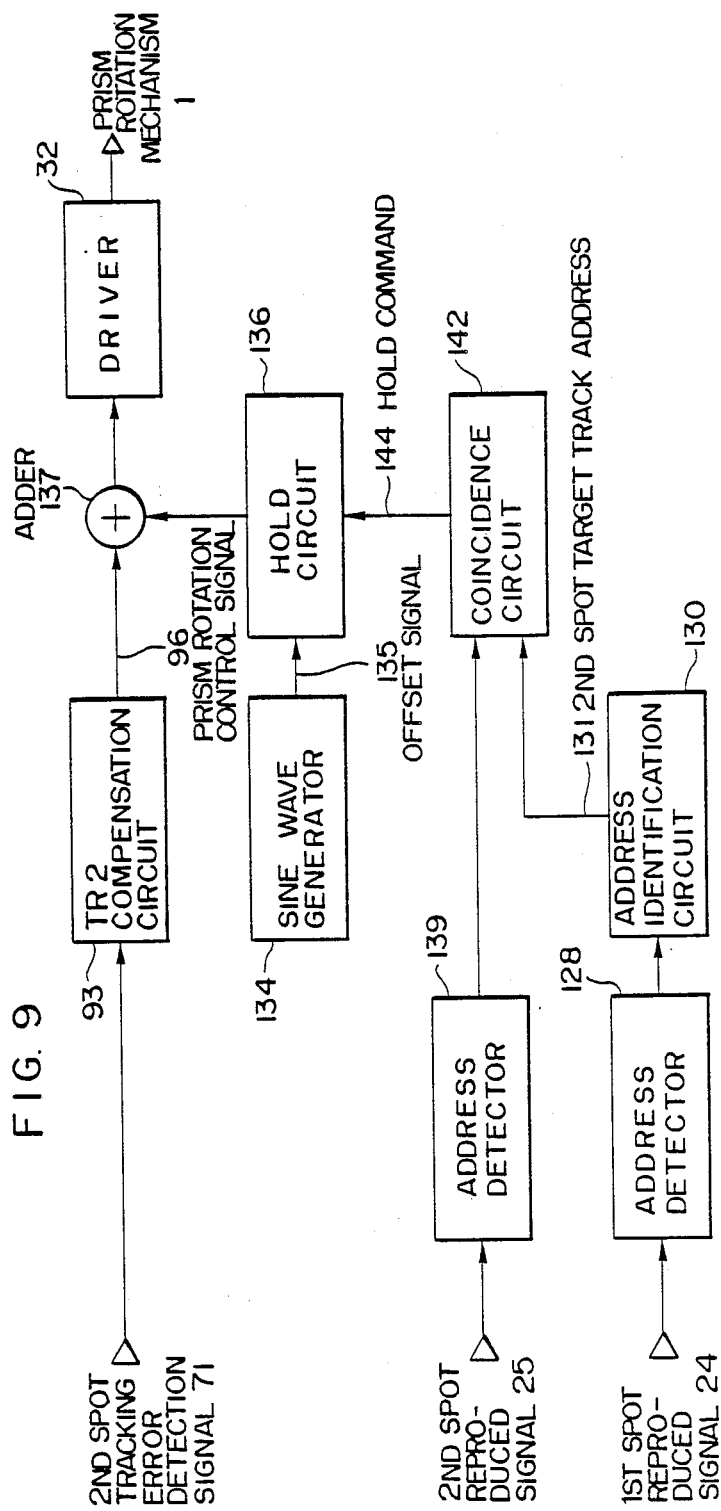
FIG. 9 shows a block diagram of a circuit for executing a light spot auto-setting sequence.
Figure 10:
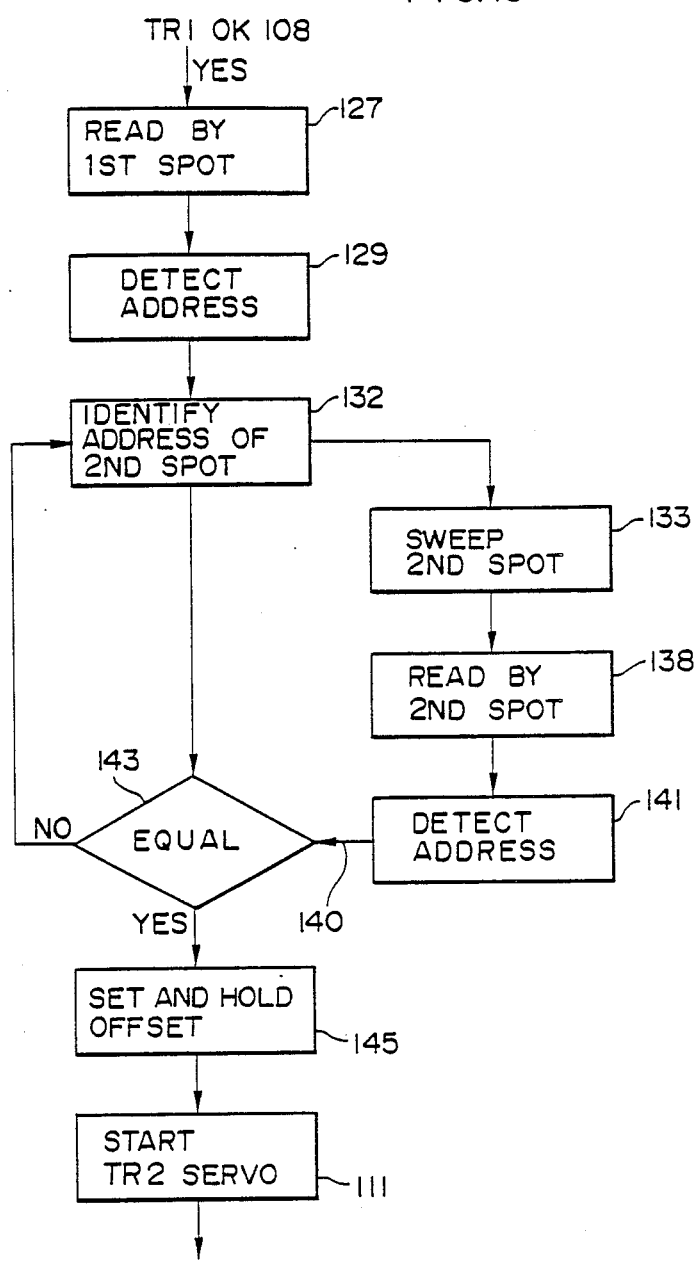
FIG. 10 illustrates a sequence to operate the circuit of FIG. 9, FIGS. 11 and 12A show two types of optical system for eliminating a deviation of a light spot in a photo-sensing plane, respectively.

FIG. 9 shows the circuit block diagram and FIG. 10 shows the sequence chart.

When the decision 108 of the TR1 pull-in detection circuit is YES, the reproduced signal 24 for the first light spot is read 127. A track address signal may be used as information on the disk to identify the track. The address detection circuit 128 detects 129 an address followed by the first light spot 9. The detected address is supplied to an address recognition circuit 130 which recognizes 132 the address 131 of the track to which the second light spot 10 is to follow.

Then, the second light spot 10 is forcibly swept over several tracks. A sine wave oscillator 134 supplies a sinusoidal offset signal 135 having a period corresponding to the disk rotation period to a hold circuit 136, an output of which is added to a prism rotation control signal 96 by an adder 137. Under this condition, the hold circuit 136 is not activated and the offset signal is supplied to the adder 137. Since the TR2 servo control is not started, the prism rotation mechanism is driven only by the offset signal 135. The reproduced signal 25 is then read 138 for the second light spot 10. The address 140 of the track on which the second light spot 10 is positioned as the light spot is swept 133 is detected 141 by the address detection circuit 139. In order to avoid malfunction, the address detection circuit 139 has a certain threshold so that the address is not detected unless the input reproduced signal 25 is larger than the threshold. The target track address 131 for the second light spot and the track address 140 detected for the second light spot 10 are compared 143 by a compare circuit 142, and if they are equal, a hold command 144 is issued. In response to the hold command 144, the hold circuit 136 sets and holds the current offset. Under this condition, the second light spot is generally positioned to the target track. Since the precision of positioning depends on the threshold level of the address detection circuit 139, the threshold level of the address detection circuit 139 is set to hold the offset which assures a range narrower than ±0.4 µm so that the second light spot 10 is not pulled into the track other than the target track when the TR2 servo control is effected by at least the tracking error signal 71 for the second light spot 10. By positioning the second light spot 10 within the positioning precision and the starting 111 the TR2 servo, the second light spot 10 can follow the target track with the high precision of less than ±0.05 µm. The address detection circuits 128 and 139 need not be separate circuits but they may share one address detection circuit. In this case, however, a function for switching the input signals, namely the reproduced signal 24 of the first spot and the reproduced signal 25 of the second spot is added. Thus, the address is detected 129 for the first spot 9, an end command from the address recognition circuit 130 is received when the address recognition 132 of the second spot has been completed, and the input to the address detection circuit is switched from the reproduced signal 24 for the first light spot to the reproduced signal 25 for the second light spot.

Figure 12A:
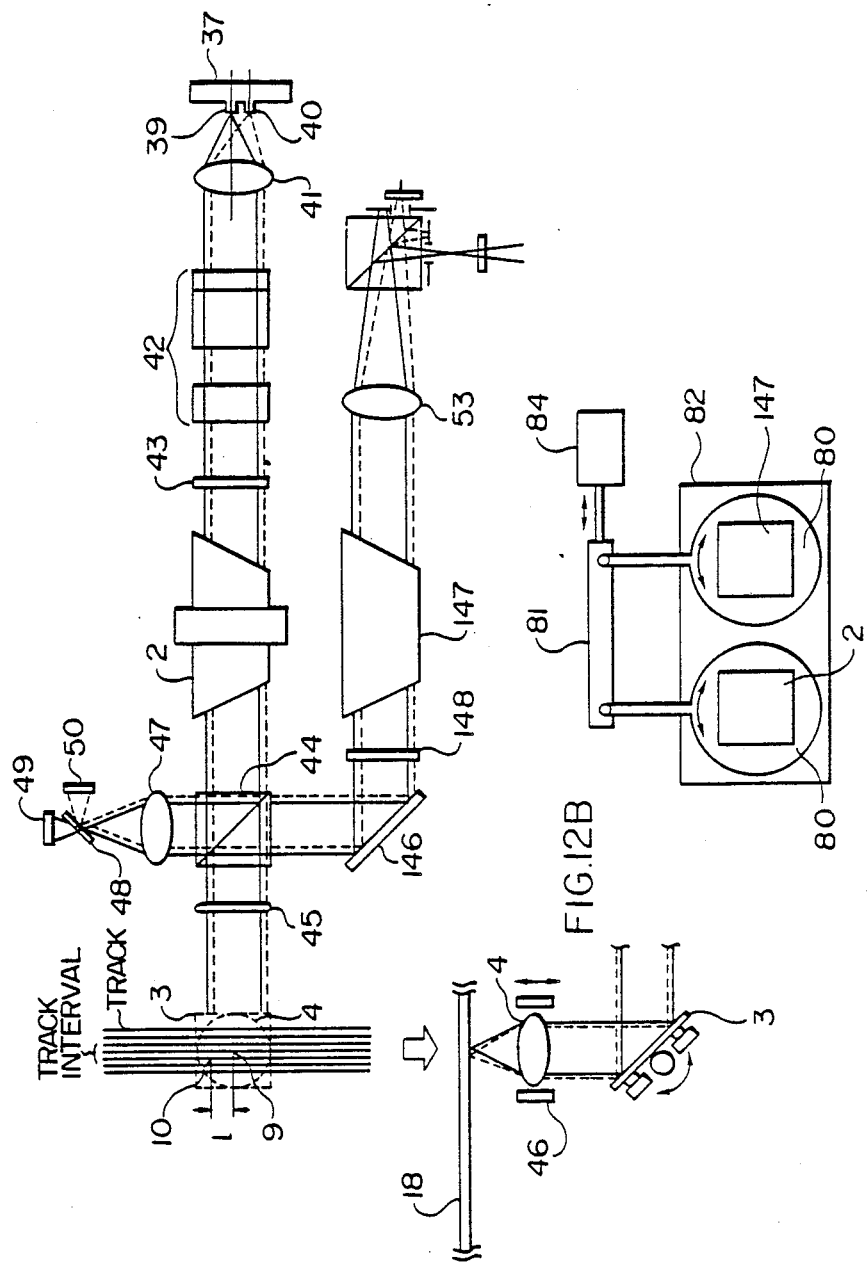
FIG. 12B shows a rotation mechanism in conjunction with FIG. 12A.
Figure 12B:
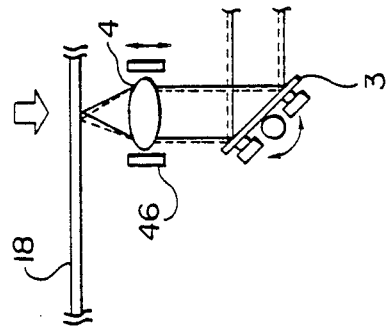

When the method relating to the target track detection and setting function is used, the light spot 73 (FIG. 3B) on the plane of the photo-detector 60 for the second light spot 10 in the optical system of FIG. 3A offsets on the plane of the photo-detector 60 as the Dare prism 2 is rotated because the rotation angle of the Dare prism 2 is wide, and the tracking error detection signal 71 of the second light spot may be slightly offset. The offset does not raise a problem if the movement of the light spot is in the order of one track interval, but it can be completely eliminated by using an optical system shown in FIG. 11 or FIGS. 12A and 12B. In FIG. 11, the Dare prism 2 of the optical system of FIG. 3A is moved to a position between the Galvano mirror 3 and the λ/4 plate 45. As a result, the incident beam is deflected by the Dare prism 2 but the reflected beam from the disk is again deflected by the Dare prism 2 to the same direction as that of the incident beam. Accordingly, the light spot 73 is not moved. However, there is a light loss because the circular polarization beam is applied to the Dare prism 2. In order to eliminate the light loss, a mirror 146, an equivalence 147 to the Dare prism 2 and a λ/2 plate 148 are inserted between the polarization beam splitter 44 and the separation lens 53, as shown in FIG. 12A. The same effect as that of the optical system of FIG. 11 can be attained by rotating the two Dare prisms 2 and 147 by the same angle by the rotation mechanism shown in FIG. 12B. The light loss can be eliminated by converting the S polarization reflected beam to the P polarization by the λ/2 plate 148 and applying it to the Dare prism 147.

Figure 13B:
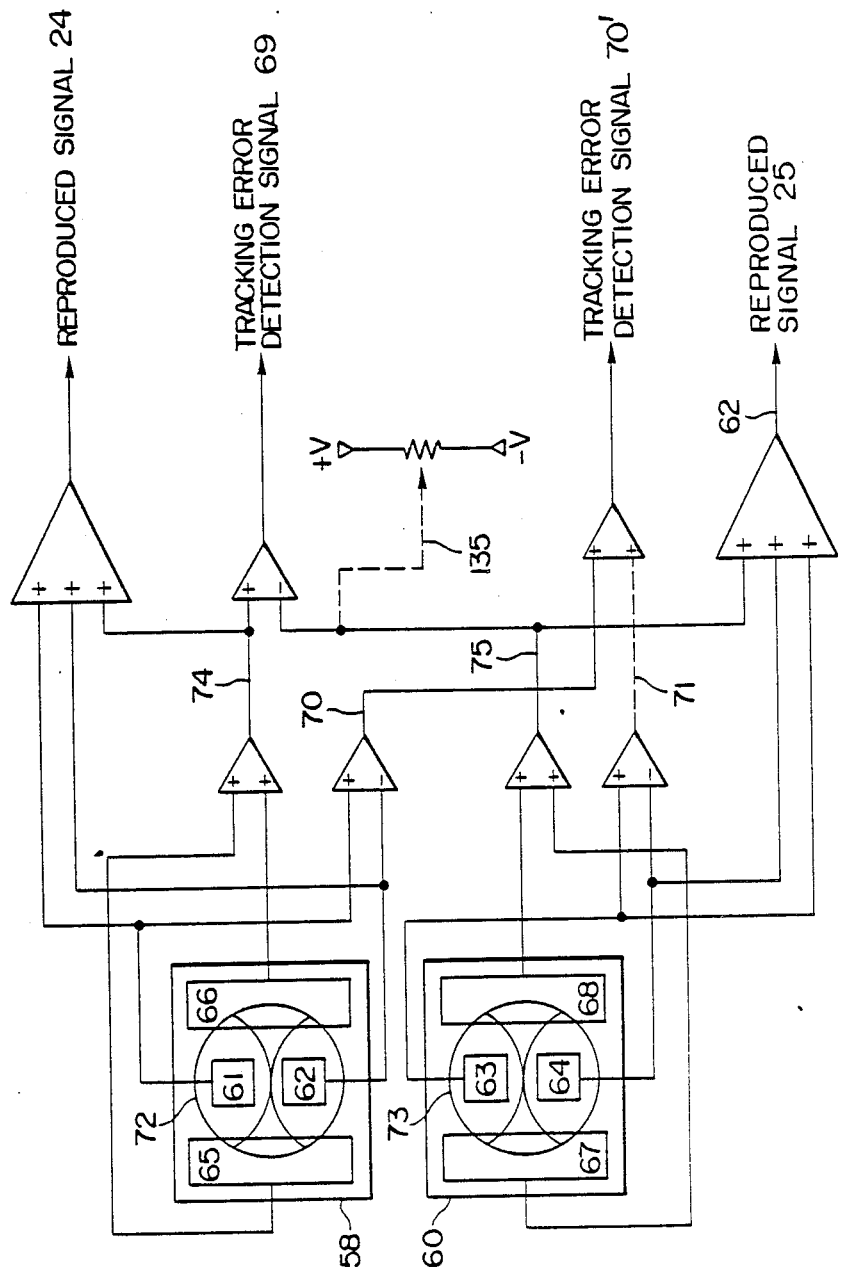
FIG. 13B illustrates detection of tracking error, focusing error and reproduced signal in FIG. 13A.

In the above embodiment, the rotation of the Dare prism 2 is controlled by the rotation mechanism 1 which is driven by the tracking error detection signal for the second light spot. However, the rotation mechanism 1 is not absolutely necessary. FIG. 13A shows an embodiment without the rotation mechanism 1. FIG. 13B shows a diagram for detecting a focusing error, tracking error and reproduced signals in FIG. 13A. The adjustment of the optical system for positioning the light spots 9 and 10 to the target tracks is explained. Since the center axis of the beam from the light source 39 aligns to the optical axis of the optical system, the light system can be adjusted as a one-light source optical system by activating only the light source 39. For the automatic focusing control, both the reflected light beams 51 and 52 are used. Accordingly, as shown in FIG. 13B, an offset signal 135 is used instead of the sum signal 75 for the reflected light beam 52 to the light source 40 to effect the automatic focusing control. At this stage, the photo-detector 58 is two-dimensionally adjusted to effect the automatic focusing control and the tracking control. When the two light spots 9 and 10 are to be positioned to the adjacent tracks as shown in FIG. 13A, signals of different frequencies are recorded on the tracks so that radial sequence of the tracks can be distinguished. Both the light sources 39 and 40 are activated and the automatic focusing control and the tracking control are effected only by the photo-detector 58. The signal from the light spot 9 is detected and the Dare prism 2 is slightly rotated so that the signal on the adjacent track can be detected by the light spot 10 at a maximum S/N ratio. Since the light spot 9 is formed by the light source 39 the center axis of whose output beam aligns to the optical axis of the optical system, the light spot 9 does not deviate from the target track even if the Dare prism 2 is rotated. The Dare prism 2 is then fixed while the light spots 9 and 10 are positioned to the respective target tracks. Then, the automatic focusing control and the tracking control are released, the actuator 46 is vertically vibrated by the sine wave signal, and the photo-detector 60 is two-dimensionally adjusted so that the waveform of the sum signal 75 coincide with the polarity-inverted waveform of the sum signal 74. In this manner, the automatic focusing control by the differential detection system using different reflected light beams 51 and 52 can be effected.

In the above embodiments, the parallel recording and reproduction is effected by using two light spots. For disks of different recording and reproducing methods, information can be recorded and reproduced by automatically rearranging the light spots. To this end, the address recognition circuit 130 is provided with a function to change the recognition of the track to which the second light spot 10 is to follow, in response to a command from the controller. For example, when the information to be processed need high transfer rate such as image data, an address of the adjacent track to the track detected by the first light spot 9 is outputted for the input of the address of the track detected by the first light spot so that it is recognized as the track to which the second light spot 10 is to follow. In this manner, the two light spots can follow the adjacent tracks to effect the parallel recording and reproducing. On the other hand, when information requiring high reliability is to be processed, the track address detected by the first light spot 9 is outputted. Thus, the two light spots follow the same track while one light spot is used for recording and the other light spot is used for detecting recording error. As a result, highly reliable parallel recording and reproduction is attained.

While two light spots are used in the above embodiments, three or more light spots may be used.

Figure 14:
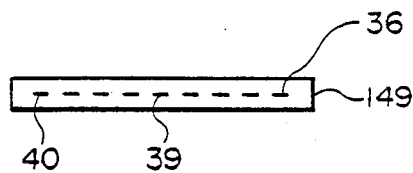
FIG. 14 shows a laser array having three or more light sources.
Figure 15:
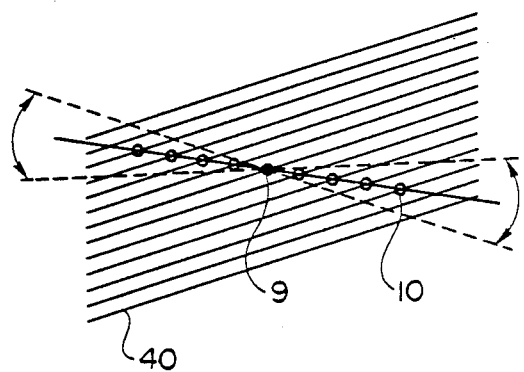
FIG. 15 shows arrangement of multiple light spots on a disk plane.
Figure 16:
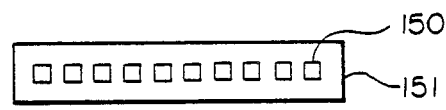
FIG. 16 shows a photo-detector array for detecting reproduced signals rbm the multiple light spots.

As the laser array 149 having a plurality of light sources, one having n activation layers arranged on one mount at a constant pitch is used, as shown in FIG. 14. One center activation layer of the n activation layers 36 is used as a first light source 39 and one of the rest is used as a second light source 40 to apply them to the optical system shown in FIGS. 3A, 11, 12A or 13A. In order to avoid the loss of the optical system, the arrangement and the setting angle of the λ/2 plate 43 are changed and the setting of the beam reshaping prism 42 is also changed. As a result, the plurality of spots on the disk other than the first spot 9 rotate around the first spot 9 as the Dare prism is rotated, as shown in FIG. 15. In this manner, the plurality of light spots can follow the respective target tracks by effecting the tracking control for only two light spots. In order to produce the reproduced signals for the respective light spots, another half-prism is inserted between the polarization beam splitter 44 and the separation lens 53 in FIG. 3A to split the reflected light beam into two. The light beam component reflected by the prism is enlarged and focused, and a photo-detector array 151 having n photo-sensing planes 150 arranged in a line is arranged on the focal plane of the light beam as shown in FIG. 16. In this manner, the reproduced signals for the respective light spots are produced on the respective photo-sensing planes.

In the above embodiments, the optical head which uses the deflection mechanism of the image rotation prism is used to position the plurality of spots. In another embodiment, other deflection mechanism is controlled, that is, the directions of output beams of the semiconductor laser array are controlled to position the plurality of spots.

Figure 17:
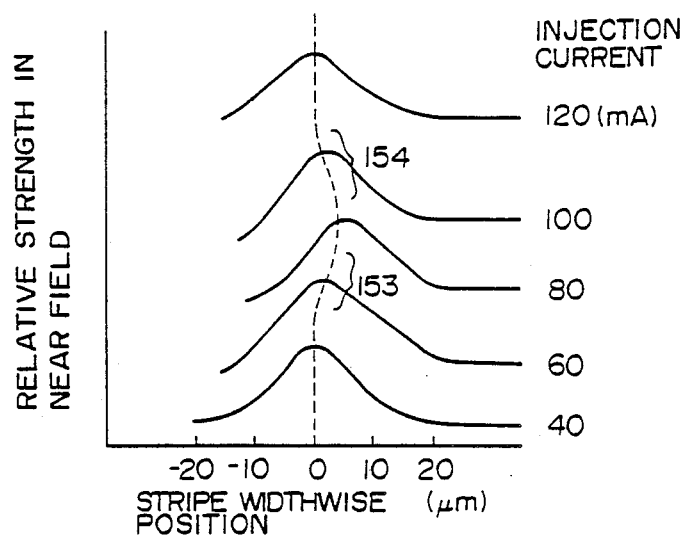
FIGS. 17, 18A and 18B show characteristics of semiconductor lasers used in other embodiments of the present invention.
Figures 18A, 18B:
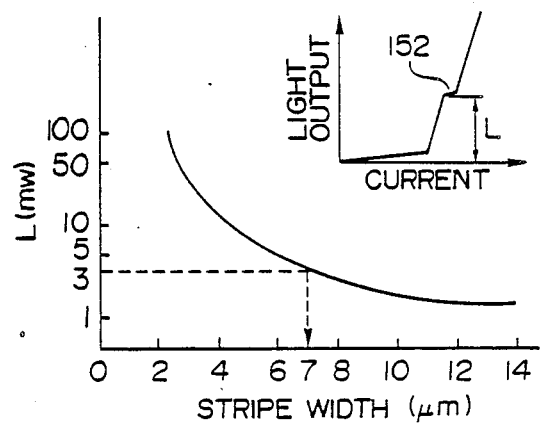

This method utilizes a property of the semiconductor laser that the direction of output beam distribution changes with an injection current. FIG. 17 shows an example of the characteristic. An abscissa represents a widthwise position on a stripe (distance from a center of the stripe) and an ordinate represents a relative strength in a near view field. It is seen that the relative strength distribution in the near field deviates from the center of the stripe as the injection current increases. This is due to asymmetry in the carrier density distribution in the stripe caused by the injection current, and the phenomenon is prominent in a gain waveguide type laser. An effect to the light output in a far field appears as a step 152 in a light output-injection current characteristic of FIG. 18A. This is due to deviation from the far field because of the change in the direction of output beam. The point at which the step 152 occurs depends on the stripe width. FIG. 18B shows a relation between the light output L at the step 152 and the stripe width. In order to utilize the characteristic of FIG. 17, the injection current is set to a region 153 or 154 in which the direction of output beam approximately linearly changes with the injection current, and the injection current is finely controlled by the tracking error signal to change the direction of output beam so that the light spot follows the target track.

In the present embodiment, the optical system of FIG. 3A without the Dare prism 2 is used and the recording light spot and the reproducing light spot are rendered to follow the same track to provide a two-spot optical head which allows parallel recording and reproduction.

In the laser array 37 used in FIG. 3A, a gain waveguide type laser chip having the step 152 near a 3 mW output area is used as the second light source 40 so that a light power on the disk is approximately 1 mW while a light power loss of the optical system is 30%, and a distributed refractive index type laser chip having no step 152 over a wide light output range is used as the first recording light source 39. The stripe width of the chip of the second light source 40 is 7 μm as shown by a broken line in FIG. 18B, and the injection current at the 3 mW light power output is 60 mA in the region 153 shown in FIG. 16. The prism rotation control signal 96 shown in FIG. 6B is used as the laser injection current control signal to control the laser drive current source of the second light source 40 so that the first and second light spots 9 and 10 follow the same track to attain the parallel recording and reproduction. Since the present embodiment does not need the rotation mechanism such as image rotation prism, a compact optical head can be provided.

In accordance with the present invention, a plurality of light spots recognize their respective target tracks and the plurality of light spots are positioned to those tracks within the precision with which the tracking servo mechanism can pull in the light spots. The respective light spots can precisely follow the target tracks by the control of the tracking servo mechanism which renders the first and second spots to follow the target tracks. Accordingly, when a temperature drift occurs in the optical system or disks of different recording and reproducing methods are used to record and reproduce information, or disks having different track pitches are used, the plurality of light spots can be precisely positioned to the target tracks. Since the separation/detection optical system for the reflected light beam is shared by the control signal detection optical system, the simple and compact optical recording and reproducing apparatus having plural light sources is provided.

What is claimed is:

1. A multi-spot positioning control apparatus, comprising:
   a plurality of light sources;
   an optical system having an optical axis thereof aligned to a center axis of a light beam from a first one of said light sources for focusing light beams from said light sources into a plurality of spots on a record plane;
   spot positioning means for rotating the spots other than a first spot for the light beam from said first light source around said first spot on said record plane to position said plurality of spots to respective target tracks;
   a first tracking mechanism for detecting a tracking error signal for at least one of said first spot and a second spot being one of said other spots to collectively control the positions of the respective spots based on said tracking error signal so that said plurality of spots follow the respective target tracks;
   a lens for enlarging and focusing a first light beam and a second light beam reflected by said record plane, said first and second light beams resulting from a splitting of the light beams from said light sources and corresponding to the first spot and the second spot, respectively;
   a splitting element arranged between said lens and a focal plane thereof for splitting each of the first and second light beams into a transmitted portion and a reflected portion;
   first and second slits arranged between first and second focal planes of the first and second light beams and said split element, respectively;
   said first slit being arranged to block the reflected portion of the second light beam and to transmit the reflected portion of the first light beam;

a first photo-detector for sensing the reflected portion of the first light beam;

said second slit being arranged to block the transmitted portion of the first light beam and to transmit the transmitted portion of the second light beam; and a second photo-detector for sensing the transmitted portion of the second light beam.

2. An optical recording and reproducing apparatus according to claim 1 wherein said first and second photo-detectors each have at least four vertically and horizontally divided photo-sensing planes, said second photo-detector is arranged between said second slit and said second focal plane, said first photo-detector is arranged at a position spaced from said first focal plane in the direction of travel of the reflected portion of the first light beam by the same distance as the distance between said second photo-detector and said second focal plane, automatic focusing control is effected by using two upper and lower photo-sensing planes of each of said photo-detectors so that a diameter of a light beam on the first photo-detector corresponding to the reflected portion of the first light beam is equal to a diameter of a light beam on the second photo-detector corresponding to the transmitted portion of the second light beam, tracking control is effected by using two left and right photo-sensing planes of at least one of said photo-detectors, and information is read by using a portion or all of the four photo-sensing planes of each of the photo-detectors.

3. An optical recording and reproducing apparatus according to claim 2 wherein third and fourth photo-detectors are arranged on blocking planes of said first and second slits, respectively, said third photo-detector detects the reflected portion of the second light beam, and said fourth photo-detector detects the transmitted portion of the first light beam.

4. An optical recording and reproducing apparatus comprising:

an optical head having an image rotation prism for rotating spots of light other than a first spot of light around the first spot, each of said spots irradiating a disk and corresponding to light beams emitted by a plurality of laser light sources;

said first spot corresponding to one of the beams emitted by said laser light sources that has a center axis thereof aligned with an optical axis of said optical system;

a first tracking servo mechanism for detecting a first tracking error signal for the first spot and controlling a deflection mechanism for radially swinging all of the spots irradiating the disk to cause the first spot to follow a target track;

a second tracking servo mechanism for detecting a second tracking error signal for a second spot corresponding to a beam out of one of the beams emitted by said laser light sources having a center axis thereof misaligned with the optical axis of said optical system, and controlling the rotation of said image rotation prism so that all spots other than the first spot rotate around the first spot irradiating the disk to cause the second spot to follow the target track; and target track detection and setting means for selecting a track address corresponding to a track to be followed by the second spot in relation to a track address for the first spot and controlling the rotation of said image rotation prism to rotate the second spot, detecting the track address for the second spot, and positioning the second spot to a track having the same address as the selected track address.

5. An optical recording and reproducing apparatus according to claim 4, wherein the first spot and the second spot are each used to record data onto the disk and to read data from the disk.

6. An optical recording and reproducing apparatus for focusing beams emitted by a plurality of laser light sources onto target tracks on a disk, comprising:

an optical head having a focusing optical system including a lens for collimating diverging beams emitted by said laser light sources, a lens for focusing the collimated beams into focused light spots on the disk, and a deflection mechanism for integrally swinging the focused light spots radially of the disk;

an image rotation prism arranged in said focusing optical system for rotating the light spots other than a first light spot on the disk around the first light spot on the disk;

said first light spot corresponding to one of the beams emitted by said laser light sources having a center axis thereof aligned to an optical axis of said optical system;

a first tracking servo mechanism for detecting a first tracking error signal for the first spot and controlling said first deflection mechanism to cause the first spot to follow a target track;

a second tracking servo mechanism for detecting a second tracking error signal for a second spot corresponding to one of the beams emitted by said laser light sources having a center axis thereof misaligned with the optical axis of said optical system, and controlling the rotation of said image rotation prism to cause the second spot to follow a target track; and target track setting means for selecting a track address of a track to be followed by the second spot in relation to a track address of the first spot, rotating said image rotation prism to rotate the second spot, detecting the track address of the second spot, and positioning the second spot to a track having the same address as the selected track address.

7. An optical recording and reproducing apparatus according to claim 6, wherein the first spot and the second spot are each used to record data onto the disk and to read data from the disk.

8. A multi-spot positioning control apparatus, comprising:

a plurality of light sources;

a common optical system having an optical axis thereof aligned with a center axis of a light beam radiated by a first one of said plurality sources for focusing light beams radiated by said light sources into a plurality of spots on a record plane having respective target tracks;

a first tracking mechanism for detecting a tracking error signal for a first spot corresponding to a light beam radiated by a first light source of said plurality of light sources to collectively control positions of said plurality of spots based on said tracking error signal so that said plurality of spots follow the respective target tracks;

an image rotation prism, arranged in said optical system, having a center axis of rotation thereof aligned with the optical axis of said optical system, for rotating all the spots other than the first spot around the first spot on said record plane; and means for automatically positioning a spot by detecting a track followed by said first spot, ascertaining a track to which a second spot other than said first spot is to be positioned and positioning said second spot to said ascertained track by rotating said image rotation prism.

9. A multi-spot positioning control apparatus according to claim 8, further comprising a second tracking mechanism for detecting a second tracking error signal for a second spot and for controlling the rotation of the image rotation prism so that the second spot follows the ascertained track based on said second tracking error signal.

10. A multi-spot positioning control apparatus according to claim 9, wherein said second tracking mechanism has a narrower servo band than that of said first tracking mechanism.

11. A multi-spot positioning control apparatus according to claim 9, wherein said second tracking mechanism has a lower servo gain than that of said first tracking mechanism.

12. A multi-spot positioning control apparatus according to claim 9, wherein said second tracking mechanism has a wider servo band than a rotational frequency of said record plane.

13. A multi-spot positioning control apparatus according to claim 9, wherein said second tracking mechanism is driven by using the means value of said first and second tracking error signals.

14. A multi-spot positioning control apparatus according to claim 9, wherein said second tracking mechanism comprising a hold means for holding a drive signal which drives said second tracking mechanism.

15. A multi-spot positioning control apparatus according to claim 8, wherein each of said plurality of spots, including the first spot and the second spot, is used to record data onto said record plane and to read data from said record plane.

16. A multi-spot positioning control method wherein, in focusing a plurality of light beams radiated by a plurality of light sources into a plurality of spots on a record plane by a common optical system, a first tracking error signal is detected for a first spot corresponding to one of said plurality of light beams having a center axis thereof aligned with an optical axis of said optical system, and a first tracking mechanism for collectively controlling positions of said plurality of light spots is controlled based on said first tracking error signals to cause the spot to follow a target track of the record plane;

said method comprising the steps of:

ascertaining a track to which a second spot other than said first spot is to be positioned in relation to the track followed by the first spot; and rotating an image rotation prism, having a center axis of rotation thereof arranged in said optical system to coincide with the optical axis of the optical system, to rotate all the spots other than the first spot around said first spot on said recording plane so that said second spot is positioned to said ascertained track.

17. A multi-spot positioning control method according to claim 16 wherein a second tracking error signal for the second spot is detected, and a second tracking mechanism for rotating the image rotation prism is controlled in accordance with the second tracking error signal to cause the second spot to follow the target track.

18. A multi-spot positioning control method according to claim 17 wherein the drive conditions for said first tracking mechanism and said second tracking mechanism are held at conditions existing when said plurality of spots are positioned to respective target tracks, tracking is released, the spots are moved to a particular area on said record plane, and the spots are positioned to the respective target tracks.

19. A multi-spot positioning control method according to claim 17 wherein after said plurality of spots have been positioned, a drive condition of said second tracking mechanism is held on tracking of the second spot is released, whereby only said first tracking mechanism is operated.

20. A multi-spot positioning control method according to claim 17 wherein said record plane is a disk, and a drive signal required for said second tracking mechanism at any radial position on the disk is calculated based on the drive signal of said second tracking mechanism required when said plurality of spots are positioned either on an innermost track or on an outermost track of the disk when the disk is loaded and the first and second spots are made to follow the target track, and said second tracking mechanism is driven by said calculated drive signal.

21. A multi-spot positioning control apparatus according to claim 16, wherein each of said plurality of spots, including the first spot and the second spot, is used to record data onto said record plane to read data from said record plane.

22. A multi-spot positioning control apparatus, comprising:

a plurality of light sources;

an optical system having an optical axis thereof aligned to a center axis of a light beam from a first one of said light sources for focusing light beams from said light sources into a plurality of spots on a record plane;

spot positioning means for rotating the spots other than a first spot for the light beam from said first light source around said first spot on said record plane to position said plurality of spots to respective target tracks; and a first tracking mechanism for detecting a tracking error signal for at least one of said first spot and a second spot being one of said other spots to collectively control the positions of the respective spots based on said tracking error signal so that said plurality of spots follow the respective target tracks; and wherein said positioning means is an image rotation prism arranged in said optical system with a center axis of rotation thereof being aligned to the optical axis of said optical system.

23. A multi-spot positioning control apparatus, comprising:

a plurality of light sources;

an optical system having an optical axis thereof aligned to a center axis of a light beam from a first one of said light sources for focusing light beams from said light sources into a plurality of spots on a record plane;

spot positioning means for rotating the spots other than a first spot for the light beam from said first light source around said first spot on said record plane to position said plurality of spots to respective target tracks;

a first tracking mechanism for detecting a tracking error signal for at least one of said first spot and a second spot being one of said other spots to collectively control the positions of the respective spots based on said tracking error signal so that said plurality of spots follow the respective target tracks; and a second tacking mechanism for controlling positioning means so that the second spot follows a respective target track;

wherein said first tracking mechanism responds to a tracking error signal for the first spot and said second tracking mechanism responds to a tracking error signals for the second spot; and said positioning means includes a rotation drive mechanism for changing a rotation angle in response to the tracking error signal for the second spot, and in image rotation prism arranged in said optical system with a center axis of rotation thereof being aligned to the optical axis of said optical system.

24. A multi-spot positioning control apparatus, comprising:

a plurality of light sources;

an optical system having an optical axis thereof aligned to a center axis of a light beam from a first one of said light sources for focusing light beams from said light sources into a plurality of spots on a record plane;

spot positioning means for rotating the spots other than a first spot for the light beam from said first light source around said first spot on said record plane to positioning said plurality of spots to respective target tracks;

a first tracking mechanism for detecting a tracking error signal for at least one of said first spot and a second spot being one of said other spots to collectively control the positions of the respective spots based on said tracking error signal so that said plurality of spots follow the respective target tracks; and a second tacking mechanism for controlling positioning means so that the second spot follows a respective target track;

wherein said first tracking mechanism responds to a tracking error signal for the first spot and said second tracking mechanism responds to a tracking error signal for the second spot; and said plurality of light sources include semiconductor lasers, and said positioning means is a deflection mechanism for varying injection currents to said semiconductor lasers to change directions of output beam distributions.

* * * * *